United States Patent
Sugimoto et al.

(10) Patent No.: US 6,678,866 B1
(45) Date of Patent: Jan. 13, 2004

(54) NOTIFICATION INFORMATION DISPLAY APPARATUS NOTIFICATION INFORMATION DISPLAY SYSTEM AND RECORDING MEDIUM

(75) Inventors: Hideo Sugimoto, Tokyo (JP); Yukio Ishikawa, Tokyo (JP); Masaki Mikami, Tokyo (JP); Toshiya Fukuda, Tokyo (JP); Tetsuya Uchida, Tokyo (JP); Tomoko Koda, Tokyo (JP); Masatoshi Akihara, Tokyo (JP); Mari Okazaki, Tokyo (JP); Shuji Kakimoto, Tokyo (JP); Takayoshi Kishimoto, Tokyo (JP); Masahiko Shima, Tokyo (JP); Hideyuki Kanai, Tokyo (JP); Tomoyuki Tada, Tokyo (JP); Motokazu Sekine, Tokyo (JP)

(73) Assignees: Hakuhodo Inc., Tokyo (JP); Tyo Productions Inc., Tokyo (JP)

( * ) Notice: Subject to any disclaimer, the term of this patent is extended or adjusted under 35 U.S.C. 154(b) by 0 days.

(21) Appl. No.: 09/345,703

(22) Filed: Jun. 30, 1999

(30) Foreign Application Priority Data

Jun. 30, 1998 (JP) ............................................. 10-184963

(51) Int. Cl.$^7$ ................................................ G06F 15/00
(52) U.S. Cl. ........................................... 715/517; 705/26
(58) Field of Search ............................ 707/517; 705/26, 705/25; 715/517

(56) References Cited

U.S. PATENT DOCUMENTS

| | | | |
|---|---|---|---|
| 5,897,622 A | * | 4/1999 | Blinn et al. ................... 705/26 |
| 5,933,811 A | * | 8/1999 | Angles et al. ................. 705/14 |
| 6,029,142 A | * | 2/2000 | Hill .............................. 705/26 |
| 6,065,057 A | * | 5/2000 | Rosen et al. ................. 345/856 |
| 6,141,666 A | * | 10/2000 | Tobin ........................... 705/27 |
| 6,240,555 B1 | * | 5/2001 | Shoff et al. .................. 725/110 |
| 6,263,505 B1 | * | 7/2001 | Walker et al. ............... 725/110 |
| 6,393,407 B1 | * | 5/2002 | Middleton et al. ............ 705/14 |
| 6,411,310 B1 | * | 6/2002 | Berquist et al. ............. 345/764 |

FOREIGN PATENT DOCUMENTS

| | | | | |
|---|---|---|---|---|
| JP | 8-137946 | 5/1996 | ........... | G06F/17/60 |
| JP | 9-269923 | 10/1997 | ........... | G06F/13/00 |
| JP | 10-145421 | 5/1998 | ........... | H04L/12/54 |

OTHER PUBLICATIONS

Japanese Patent Office, Notification of Reason for Refusal dated Feb. 13, 2002, 3 pgs. (English translation dated Jul. 11, 2003, 4 pgs.).

"Easy PC" Article, published Jun. 2, 1998, 4 pgs. (English translation dated Jul. 8, 2003, 8 pgs.).

* cited by examiner

Primary Examiner—Sanjiv Shah
Assistant Examiner—Rachna Singh
(74) Attorney, Agent, or Firm—Rosenthal & Osha L.L.P.

(57) ABSTRACT

An advertising information memory area for storing advertising information for displaying prescribed advertisement, and a label information memory area for storing label information for presenting a space for displaying advertisement, are provided. A personal computer refers the label information memory area and the advertising information memory area, synthesizes advertisement images and character strings based on the advertising information, and displays the same in the label image based on the label information. An advertising environment is provided which is highly effective in a personal computer environment.

24 Claims, 19 Drawing Sheets

W6  I2  DT  TB  I1

I4  DT  TB  I1

NOTIFICATION INFORMATION DISPLAY APPARATUS NOTIFICATION INFORMATION DISPLAY SYSTEM AND RECORDING MEDIUM

BACKGROUND OF THE INVENTION

1. Field of the Invention

This invention relates to technology for efficiently sending notifications such as the advertisements of service providers by computer, and particularly relates to a notification information display apparatus, a system therefor, and a recording medium therefor, wherewith the content of the advertisement or other notification can be modified at will.

2. Description of the Related Art

Personal computers have been used in stand-alone (independent mode) configurations and in configurations wherein they are connected to a LAN or other intra-organizational network. Registered application program icons and operational icons have been displayed on the so-called "desktops" (display screens) of display apparatuses which display image data generated by the personal computer. When a user employs a browser to connect to the internet or other network participated in by businesses, and connects to a business website, business advertisements established in that website can be displayed on the display screen of the personal computer.

There has been a problem, however, in that in providing advertisement information via the internet, a service provider cannot provide advertisement information unless a user wishes to have that information. In the case of TV commercials, which are presented irrespective of whether or not the user wishes to see them, a will to purchase can be induced in the mind of the user without the user even being aware of it. It is precisely because of this that such advertisements have value. In the conventional personal computer environment wherein advertisement information can only be presented when a user accesses that information, a manufacturer is unable to actually conduct the advertising deemed necessary.

This being the case, even though advertisement information may be offered in a recording medium or an advertisement display application program may be offered for the purpose of displaying advertisement images on the computer desktop, the advertisement is usually not information needed by the user, wherefore the effectiveness of advertising by these means cannot be said to be anything but low.

There are also application programs, meanwhile, wherewith it is possible for the user to write any message he or she wishes to, and to paste tag-like images in any desired position on the desktop (display screen). When such an application program is run on personal computers provided with communications functions that form a network such as a LAN, a user can send messages written on a "tag" to another personal computer. And the personal computer to which this message is sent is configured so that it can display the message on a "tag" image.

SUMMARY OF THE INVENTION

In view of the problems noted in the foregoing, the inventors made a thorough study of effective advertising methods in the personal computer environment, and came up with the idea of adding advertising functions to application programs such as that mentioned above, developed in the interest of user convenience, and of making it possible to renew the advertisement content.

More specifically, a first object of the present invention is to provide technology for implementing advertising that is highly effective in the personal computer environment by making it possible to display advertisements and other notification information on a label image.

A second object of the present invention is to provide advertising technology wherewith it is possible to implement advertising coordinated with times of high advertising effectiveness by making it possible to control the display of advertisements and other notification information according to time.

A third object of the present invention is to provide advertising technology wherewith it is possible, from advertisements or other notification information, to display more specific advertising information.

A fourth object of the present invention is to provide advertising technology wherewith it is possible to conduct effective advertising while stimulating user interest, by securing a display area for advertisements and other notification information which simulates an actual paper image.

A fifth object of the present invention is to provide advertising technology wherewith it is possible to stimulate user interest by making it possible to modify the label image.

A sixth object of the present invention is to provide advertising technology wherewith it is possible to present useful information while stimulating user interest, by presenting attractive label images which speak dialogue lines.

A seventh object of the present invention is to provide advertising technology wherewith it is possible to implement highly effective advertising the content whereof is modified according to the time, by employing a configuration wherewith it is possible to sequentially supply advertisements and other notification information.

The present invention is a notification information display apparatus comprising: a notification information memory area for storing notification information for displaying prescribed information; a label information memory area wherein is stored label information for providing the area for displaying the notification; and a controller configured so as to refer the label information memory area and the notification information memory area, and output image data for synthesizing notification images and/or notification character strings, based on the notification information, and displaying these on the label image generated on the basis of the label information.

The term "notification" as used herein includes advertisements and all other information communicated by a service provider to a user. Government notices made by a government agency are also included, for example. By "label" is meant a display area on a computer display screen for displaying information. This term refers to an image that simulates an actual label or paper tag that can be displayed on to the desktop as though a piece of paper (tag) were affixed there. By "notification image" and "notification character string" are meant, in cases where the notification information is advertising information, trademarks, product images, and related advertising messages in that advertisement. These label images and notification images may be displayed as still pictures, or they may also be displayed as moving pictures by switching and outputting a plurality of images at prescribed intervals. A "memory area" may be formed on any kind of storage medium which can be referred by computer equipment. This includes not only internal memory devices such as a RAM, ROM, or hard disk, but also such devices as a floppy disk, CD-ROM, or DVD, and even external memory devices such as those of a remote server accessed via a communication line.

In the present invention, the notification information noted above is inclusive of time-designating information which specifies the time period that information is to be displayed, and the controller is configured so that it compares the time-designating information with time information defining the current time, and, when the current time corresponds with the display time specified by that time-designating information, enables the display of that information.

"Time-designating information" as used here may be information which indicates a notification end time that indicates the valid time period for a notification. The term "time" or "time period" as used here includes not only dates (year/month/day), but also units of time down to hours, minutes, and seconds.

In the present invention, the notification information noted above includes address information that indicates network addresses related to a given notification, and the controller is configured so that, when address information is contained in the notification information, it incorporates that address information in the notification character strings which are synthesized in the label image, and establishes link information for linking a network address to that address information.

The "notification character string" containing the address information may be a URL designation, and IP address, or some other related character string display.

In the present invention, the label information described earlier contains label image data for its front and back sides, respectively, and the controller is configured so that it selects either the front or back side of a given label image and outputs image data for either that front or back side.

The label information described in the foregoing comprises one or more replacement label image data for replacing and displaying a given label image, either in part or in whole, and the controller is configured so that it selects replacement label image data in response to operating signals, and generates image data for displaying an image corresponding to the replacement label image data selected in a part or the whole of that label image.

By "replacement label image data" for replacing only "a part" is meant data that, when the label image displays a character figure, for example, are for replacing facial expressions and other components of that character figure. By "replacement label image data" for replacing "the whole" is meant data that, when the label image displays a character figure, for example, completely replace that character figure with another character figure.

The label information described in the foregoing includes dialogue line information for displaying dialogue lines corresponding to a given label image, and the controller is configured so that it can detect the position of a cursor, and, after determining that the cursor position so detected is a position corresponding to the label image, can refer the dialogue line information and display the dialogue line in the vicinity of that label image.

By "dialogue line" is meant a character string that, if the label image displays a character figure, expresses words spoken by that character figure. However, it may also display a part of the information relating to that label. The term "label image," as used here, includes not only full-size label images (with front side and back side), but also minimized images that are minimized icons. The "vicinity," as used here, may be inside or outside of the label image. The label display, while displaying so-called pop-up dialogues, also includes the display of dialogue line characters strings therein. It may also display the label user (sender) or notification information.

In the present invention, the controller is configured so that it stores message information representing messages entered by an operator, and so that it can generate image data for displaying messages based on such message information in a designated area of the label image.

The area where the "message" is displayed may be the front side or the back side of the label image, or it may be in the vicinity thereof.

The label information described in the foregoing includes minimized image data for displaying the label image in a minimized size, and the controller is configured so that, when minimization is designated, it can output the minimized image data in place of the image data that display the label image, and, when it has determined that the cursor is positioned over that minimized image, can refer message information associated with that label and display at least part of that message in the vicinity of that minimized image.

The term "cursor" refers to something like a mouse pointer. The phrase "at least part of the message" refers to a prescribed number of characters at the beginning of the character string for the message, for example. This configuration may of course be such that the entire message can be displayed.

The label information described in the foregoing includes a prescribed identifier, and the controller is configured so that it compares an identifier designated in that notification information display apparatus against an identifier contained in the label information, and, when those two identifiers agree, uses that label information in generating a label image.

By "identifier" is meant information for identifying a sponsor, for example. This "identifier" may also be, instead of information designating a sponsor or the like, an identifier indicating that this is a general purpose label that can be used by any sponsor.

In the present invention, the controller is configured so that it can calculate the total number of label images produced, and so that, when that total number of label images has reached a predetermined standard number, it can display a specific message.

By "standard number" is meant a numerical value that is set as desired, such as 100 or 1000. The "specific message" may contain an image or audio in addition to or besides text characters. If it contains characters, it might display a message like "Thank you for 100 uses. We are always at your service."

In the present invention, the notification information display apparatus is configured so that it can communicate with other notification information display apparatuses. It is further provided with a destination information memory area for storing destination information that indicates destination information for other notification information display apparatuses. When the transmission of a message is designated, the controller is configured so that it can refer that destination information and send the message information to the designated destination.

"Other notification information display apparatuses" include, in addition to apparatuses connected to a regional network such as a LAN, apparatuses connected by dedicated line to a network that is always open.

In the present invention, the notification information display apparatus is configured so that terminal specifying information for specifying a given notification information display apparatus can be sent to another notification information display apparatus with prescribed timing, and so that, based on terminal specifying information received from another notification information display apparatus, a list of other notification information display apparatuses to which the given notification information display apparatus is capable of transmitting message information can be displayed, inclusive of a transmit enablement display.

The "terminal specifying information" may be anything that can specify a terminal, including an IP address, etc. By "transmit enablement display" is meant a specific character symbol for altering the display mode of the other party's name when power is turned on to the other notification information display apparatus and it is in a status wherein it is capable of receiving message information.

In the present invention, the notification information display apparatus is configured so that it can, when to characteristic information for a given notification information display apparatus has been altered, send terminal specifying information including the altered characteristic information to another notification information display apparatus, and so that, when terminal specifying information has been received from another notification information display apparatus, based on the terminal specifying information so received, the given notification information display apparatus can update the list of notification information display apparatuses capable of transmitting message information.

In the present invention, the notification information display apparatus is configured so that it can communicate with other notification information display apparatuses. Also, the controller is configured so that, when message information is received from another notification information display apparatus, it can generate image data for displaying a message based on that message information in a prescribed area of the label image.

In the present invention, the controller is configured so that it can output image data for selectively displaying the front and back sides of a given label image in conjunction with an operating signal. Also, in this configuration, when message information is received and the label image is displayed, the back side of the given label image wherein are synthesized a notification image and/or part of a notification character string based on the notification information can be displayed first, and a message based on the message information can be displayed on the front side that is displayed on the basis of operator input. It is preferable that this "back side" be used primarily for displays based on notification information because, when that is done, it is possible to enhance advertising effectiveness and other information delivery effectiveness.

In the present invention, the controller is configured so that, when label image setting information is contained in message information received from another notification information display apparatus, it can generate image data for displaying that label image in a display mode corresponding to that setting information.

In other words, a label image comprising character figures or facial expressions designated by a sender can be displayed on the receiving apparatus. Should for some reason the designated label image not exist in the receiving apparatus, a predetermined default label image might be displayed instead.

In the present invention, the controller described in the foregoing is configured so that, in cases where message information has been received from another notification information display apparatus and referred by an operator, it can transmit have-opened information indicating that that message information has been referred to the other notification information display apparatus which communicated that message information.

That notification information display apparatus can then, based on the have-opened information, display a have-opened notice together with the time opened. It is also permissible to configure the controller so that the computer name and IP address pertaining to that notification information display apparatus can be sent together with the have-opened information.

The present invention is a notification information display system configured so that communications are possible via a network between the notification information display apparatuses of the present invention and a delivery system. The delivery system comprises a notification information database for storing notification information, a label information database for storing label information, and a server for controlling communications between these databases and the notification information display apparatuses. A feature of this notification information display system is that the server is configured so that it can transmit notification information stored in the notification information data base and/or label information stored in the label information data base, with specified timing, to a notification information display apparatus. It is preferable that the delivery system primarily perform transmissions of notification information, but it may also append label information at the same time if necessary.

The label information sent from the server to the notification information display apparatuses may be actual image data in a bit-map format or compressed format, but it may also be in a form such as program data that sets up an image or images in the computer (i.e. a so-called installer program). When this is the form adopted, and the user that operates the notification information display apparatus executes the program sent, the computer that executes that program will deploy the image data and store them as label information. It is preferable that the actual data be transmitted and received because of the necessity to have the notification information reflected on the label without the intervention of the user.

The controller in the notification information display apparatus of the present invention, for example, monitors the display time-designating information contained in the notification information, and, upon determining that predetermined conditions for the end time for that display time period have been reached, connects to the delivery system via the network. The server of that delivery system is configured so that, after being connected to that notification information display apparatus, it can transmit new notification information and/or label information for that notification information display apparatus. The "predetermined conditions" include, in addition to the condition that the display time period has ended, for example, conditions such as that it is within a certain time interval (one month, for example) prior to the end time, or that a certain time interval has elapsed since the start of the display, etc.

The present invention is a machine-readable recording medium whereon is recorded a program capable of operating a computer as the notification information display apparatus described in the foregoing.

The "recording medium" in the present invention, moreover, is a medium whereon information (mainly digital data and programs) is recorded by some physical means or other. It is also a medium capable of implementing prescribed functions in a is processing apparatus such as a computer or dedicated processor. This medium, in other words, only needs to be capable of downloading a program into a computer, by some means or other, and causing the prescribed functions to be implemented. Such media include, for example, flexible disks, hard disks, magnetic tape, optical-magnetic disks, CDs, CD-ROMs, CD-Rs, DVD-RAMs, DVD-ROMs, DVD-Rs, PDs, MDs, DCCs, ROM cartridges, RAM memory cartridges backed up by batteries, flash memory cartridges, and non-volatile RAM cartridges.

Also included are cases where data transfers are received from a host computer via a land wire or wireless communication line (public communication line, dedicated data line, satellite link, etc.). The so-called internet is also included in what is here called a recording medium.

DESCRIPTION OF THE PREFERRED EMBODIMENTS

Preferred embodiments for the present invention are now described with refer to the drawings.

First Embodiment Aspect

A first embodiment aspect of the present invention relates to a notification information display system for displaying advertisements and other notification information. A diagram of the notification information display system in this embodiment aspect is given in FIG. 1.

Hardware Configuration

Figure 1:
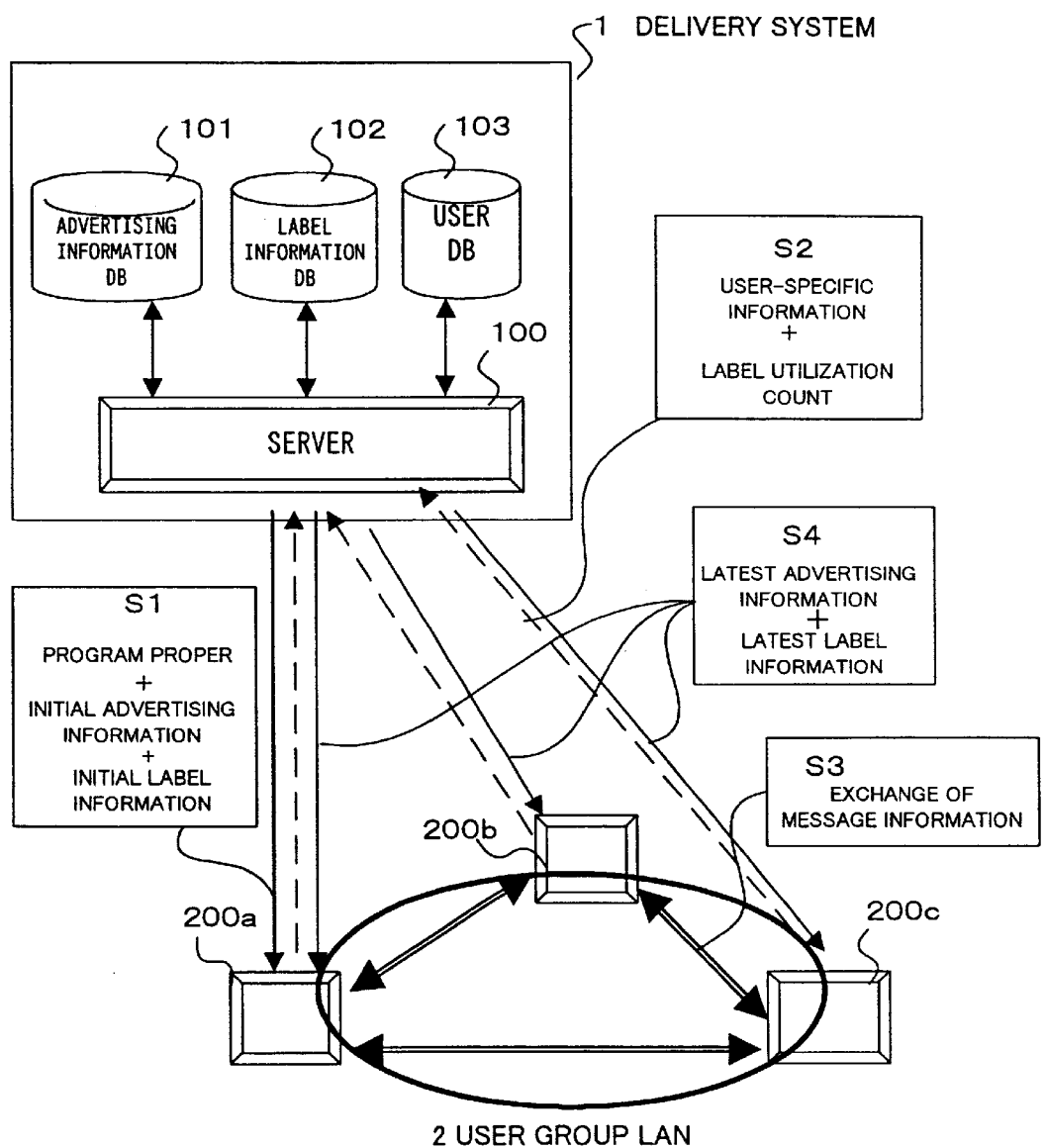
FIG. 1 is a configuration diagram of the notification information display system of the present invention.

This notification information display system comprises a delivery system 1 and a user group 2, as diagrammed in FIG. 1.

The delivery system 1, which updates information for the notification information display apparatuses, comprises a server 100, an advertising information data base 101, a label information data base 102, and a user data base 103.

The server 100 is configured as ordinary computer equipment, comprising a CPU, RAM, ROM, hard disk, and communications device, etc. The server 100 is configured so that it can read from and write to the advertising information data base 101, label information data base 102, and user data base 103. The server 100 is also capable of downloading program data, advertising information, and label information to the notification information display apparatuses 200x (where x is a, b, c, etc.), and of uploading user-specific information and label usage information, etc., from the notification information display apparatuses 200x.

The advertising information data base 101 stores advertising information so that it can be renewed. The advertising information is notification information which the service provider wishes to provide to users. In addition to so-called commercials, this information may also be notices made by a public institution or information suitable for one-way communications to an indefinite number of users. In this embodiment aspect it is assumed that the advertising information is used in commercials. The advertising information is supplied from and at the discretion of an organization (company or advertising agency, etc.) that is the advertiser which has contracted with the delivery system. The advertising information is described subsequently in greater detail.

The label information data base 102 stores label information so that it can be renewed. The label information is produced and stored by the delivery system service provider, and constitutes information for displaying label images on the desktop of the notification information display apparatus that is a computer system. The label information is described subsequently in greater detail.

The user data base 103 is for storing user-specific information, wherein is registered information pertaining to notification information display apparatus users who are participating in a delivery service for the notification information of interest. This database is not a mandatory component, but is necessary in cases where a user registration system is employed.

The user group 2 is configured by interconnecting the notification information display apparatuses 200x in an LAN environment. For this LAN, any specification can be applied, such as the Ethernet or Token-ring. However, this may also be a network connected to a specific computer or computers via a public communications line or a dedicated circuit connected with a remote area by a dedicated line. There is no limitation on the protocol used in the LAN, and a protocol such as TCP/IP may be used, for example.

Figure 2:
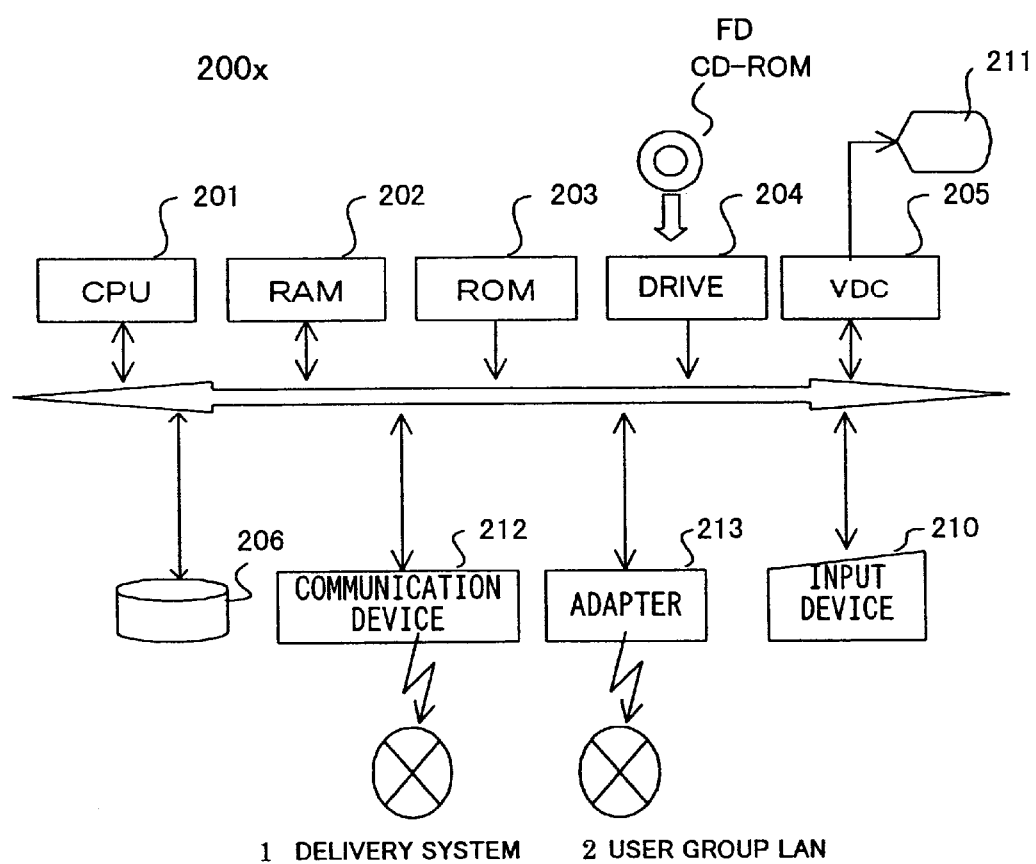
FIG. 2 is a block diagram of a notification information display apparatus.

The notification information display apparatuses 200*x* are general-purpose computer systems (personal computers) comprising a CPU 201, RAM 202, ROM 203, drive unit 204, video display circuit (VDC) 205, and hard disk 206, as diagrammed in FIG. 2. To the notification information display apparatus are also connected an input device 210, display device 211, communications device 212, and adapter 213.

The initializing program is stored in the ROM 203. The drive unit 204 accepts removable floppy disks (FDs) and is capable of reading program data stored on these recording media. However, this drive unit 204 is not limited to a floppy disk drive, and may instead be a unit capable of reading some other recording medium such as an optical disk like a CD-ROM or DVD, magnetic disk, or optical-magnetic disk. The hard disk 206 is configured so that it can read from and write to the operating system and various application programs. The RAM 202 can be used as storage space for program data stored on floppy disk or the hard disk 206, and as work space for the CPU 201. The video display circuit 205 is configured so that it can display image data transferred from the CPU 201 on the display device 211.

The input device 210 is a keyboard or mouse wherewith an operator can enter text characters or numerical values. The display device 211 is a display unit such as a CRT or liquid crystal panel for displaying text characters and numbers so that the operator can recognize them. The communications device 212 is a modem, terminal adapter, or other adapter configured so that it can send and receive programs and data over the network. It is assumed here that a communications device is provided in each computer system, but it is also permissible to employ communications conducted through an LAN router. The adapter 213 is an interface device for connecting the notification information display apparatus to the LAN, configured to be compatible with the LAN specification.

The CPU 201 is configured so that it can copy a notification information display program of the present invention from a floppy disk or communications device 212 to the hard disk 206, and, at execution time, transfer this program again to the RAM 202 and execute it. More specifically, the CPU 201, when the power is turned on, first executes an initializing program stored in the ROM 203. The CPU 201 transfers programs for the operating system of the hard disk 206 to the RAM 202, and thereafter operates in accord with the operating system. When an instruction is received from the input device 210 to execute the notification information display program of the present invention, the CPU 201 transfers the notification information display application program stored on floppy disk or in the hard disk 106 to the RAM 202, transfers the label information and advertising information, etc., to the hard disk 206, and executes the program. After that, the CPU 201 processes information input from the input device 210 in accordance with this program. The CPU 201 is also configured so that it outputs image data to the image display circuit 205 while referring the label information and advertising information, etc. However, when the floppy disk or other recording medium has a file configuration capable of causing the execution of immediately executable programs without running an installation program, the program data, label information, and advertising information, etc., may be read directly into the RAM 202 from the floppy disk loaded in the drive unit 204 and executed.

It is also permissible to configure the notification information display apparatus (with a sound-source circuit, sound-source memory, amp, speaker, etc.) so that it is capable of generating prescribed audio, in conjunction with the advertising information, based on voice data.

File Configuration

Figure 3:
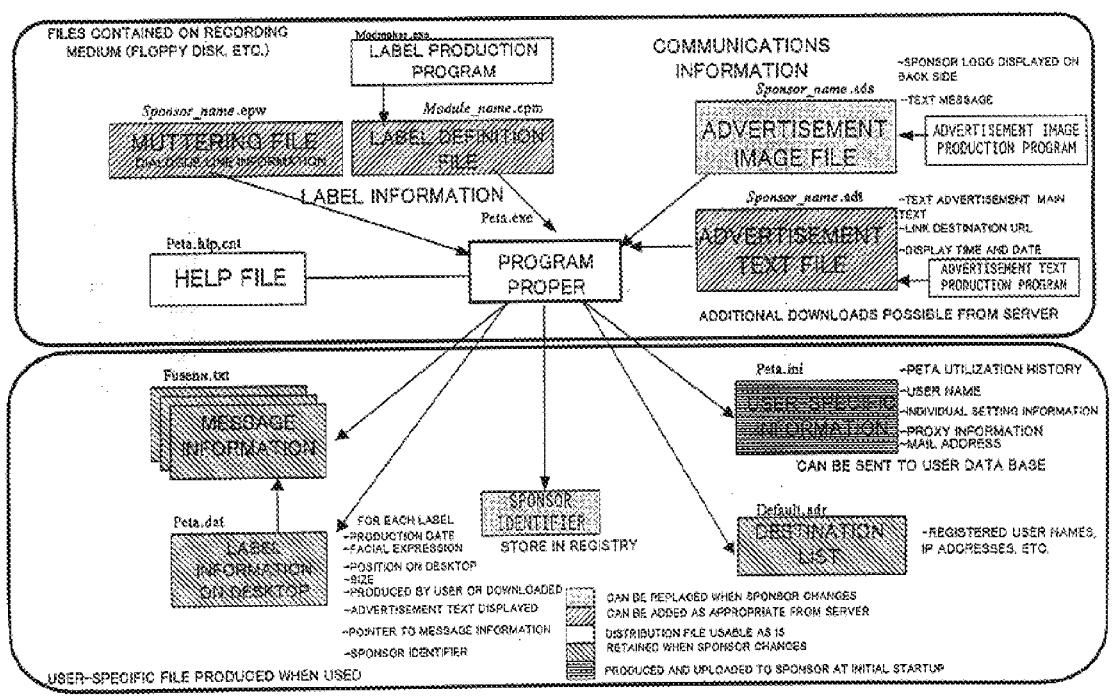
FIG. 3 is a file configuration diagram for this notification information display program.

In FIG. 3 is given a configurational diagram of the files necessary for implementing the present invention inclusive of the advertising information and the label information described earlier as featured in the present invention. As diagrammed in the upper half of FIG. 3, the program proper, advertising information, label information, and help information are stored in floppy disks or the like provided as recording media in the present invention. These files are installed in the installation order indicated in FIG. 5. After installation, as the labels are actually used, the files diagrammed in the bottom half of FIG. 3 are sequentially produced.

In Table 1 are listed the file groups stored in the floppy disks. In this table, the installation program (installer) and deletion program (uninstaller) are not indicated.

TABLE 1

| Type | File attribute | File name | Content |
|---|---|---|---|
| Program proper | | Peta.exe | Program data of present invention |
| Advertising information | Sponsor identifier definition file | Default.sps | * Sponsor identifier<br>* Valid time limit |
| | Advertisement image file | Sponsor_name.ads | * Advertisement text (font size, data)<br>* Trademark image (image data) |
| | Advertisement text file | Sponsor_name.adt | *Advertisement character string<br>* Link destination URL<br>* Display start date/time |
| Label information | Label definition file | Module_name.epm | * Label size, advertisement position<br>* Character string display position, display color information<br>* Icon image data<br>* Related label image data group<br>* Label back side image data |
| | Muttering file | Sponsor_name.epw | * Dialogue line information indicating content of muttering |

TABLE 1-continued

| Type | File attribute | File name | Content |
|---|---|---|---|
| Supplemental | Label deletion executable program | Moddel.exe | Executable file for deleting individual label definition files |
| Supplemental | Help file | Peta.hlp,cnt | Character string and control files for explaining utilization method, etc. |

In Table 1, the program proper is that which causes the computer to execute processing at the notification information display apparatus of the present invention. The advertisement image files mainly comprise image data for adver- In Table 2 are listed the file groups produced at the time of installation and use. These files are stored in the hard disk 206, for example, and are transferred and used as they become necessary.

TABLE 2

| File attribute | File name | Production update time | Content |
|---|---|---|---|
| User-specific information | Peta.ini | Update at time of use | * Utilization history<br>* User name<br>* Setting information<br>* Proxy information<br>* Mail address |
| Destination list | Default.adr | Update at time of new destination registration | * Destination user name<br>* IP address |
| Label information | Peta.dat | Create new at time of label production | Date of production, facial expression classification, display position, size, whether produced by user or received, advertisement text, message pointer, flag, sponsor identifier |
| Message information | Fusenn.txt | Create new at time of message production | Message character string input by user | tisements used on the back side of the label image. The sponsor identifier is compared against sponsor identifiers stored in a registry for the purpose of specifying a label for displaying an advertisement. The advertisement text files are the notification information of the present invention, constituting textual information that forms the advertisement proper. The label definition files constitute label information and contain front and back side label images, the sizes thereof, and related label images for representing facial expressions. The muttering files relate to dialogue lines associated with icons registered in the task bar.

The advertisement text files comprise data that are automatically downloaded from the delivery system 1 in association with the advertisement effective time limit. The advertisement image files, label definition files, and muttering files constitute notification information which is downloaded in the form of installer programs from the delivery system 1, either automatically as the sponsors change, or in response to a user operation. The download details are described in conjunction with the second embodiment aspect.

In addition to the files noted in the foregoing, control files such as advertisement text production programs, advertisement image production programs, and label production executable programs are also used. The advertisement text production programs are executable files for generating the advertisement text files. The advertisement image production programs are executable files for generating the advertisement image files. And the label production executable programs are executable files for generating the label definition files.

The destination list is produced on the bases of the terminal specifying information and registration information of the present invention. In the label information is placed a flag which indicates whether an image display is to be made as a label on the desktop or a list display is to be enabled leaving only the message information. (This list display function is called an "storage box" in this embodiment aspect.) It is by this flag that a determination is made concerning pasting a message as a label on the desktop or making it referable by opening a storage box. The sponsor identifier is specific information for identifying the sponsor that should use that label. It is contained in the label information corresponding to all labels. Symbols are attached such as "AA0" for sponsor A and "BB0" for sponsor B, etc. There are also labels to which are assigned sponsor identifiers indicating that they do not belong to any particular sponsor.

Figure 4:
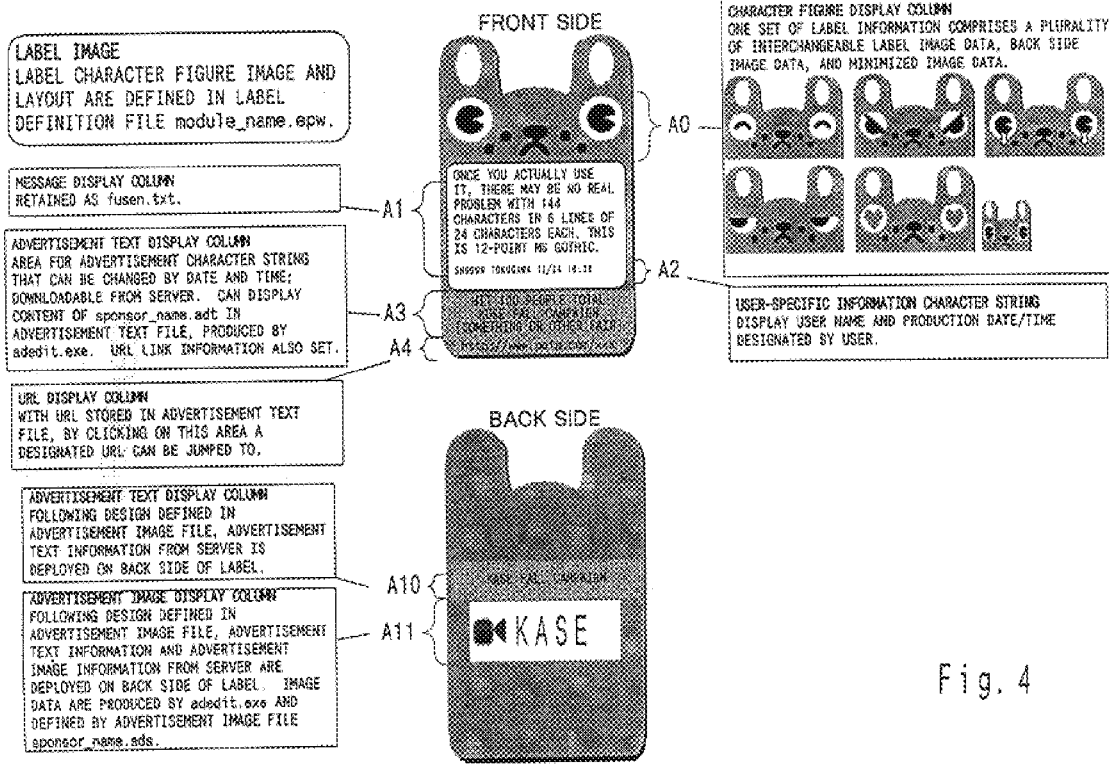
FIG. 4 is a label image definition diagram.

In FIG. 4 is represented a definition of a label image and the parts thereof which are displayed by this embodiment aspect. The label image is configured of a front side image and a back side image, as diagrammed in FIG. 4. This label image is defined by the label definition file noted in Table 1. The label image depicted here is a character figure image.

The label front side image comprises an upper character figure display column A0 and lower character string display columns A1 to A4. The face of the character figure is displayed in the character figure display column A0. The face of the character figure is configured so that it can be changed by making selections and combinations from among replacement label image data. The facial expressions can be modified by overwriting the character figure display column A0 with replacement label images. The replacement label image data can be provided up to the limit of available data capacity (up to 8 types, for example). When minimized display is selected for the label image, a minimized icon image is displayed by the minimized image data instead of the label image.

The character string display areas comprise a message display column A1, a user-specific information display character string A2, an advertisement text display column A3, and a URL display column A4. The message display column A1 is provided in the center of the label display image and can be used for displaying messages stored in message information files input by users. The user-specific information display character string A2 is a box located below the message display column A1 for displaying the user name and production date and time contained in the user-specific information. The user name is a basic setting which is registered in the user-specific information file. The production date and time is obtained by a function call made to the computer system. The advertisement text display column A3 is an area below the message display column A1 for displaying character strings stored in advertisement text files. In this advertisement text display column A3 is set link information for an internet address in the same way as set in the URL display column A4. The URL display column A4, below the advertisement text display box, is for displaying URLs stored in advertisement text files, wherein is set link information for an internet address. When a user double-clicks on this URL display with the mouse, the browser is activated, and the website specified by that URL is connected to. For each of the various types of character string noted above, a display color is defined by the label definition file.

The label back side image, which comprises an advertisement display area, is displayed by the label back side image data in the label definition file. The advertisement display area comprises an advertisement text display column A10 and a trademark image display column A11 which are generated from an advertisement image file.

Installation Procedures

Figure 5:
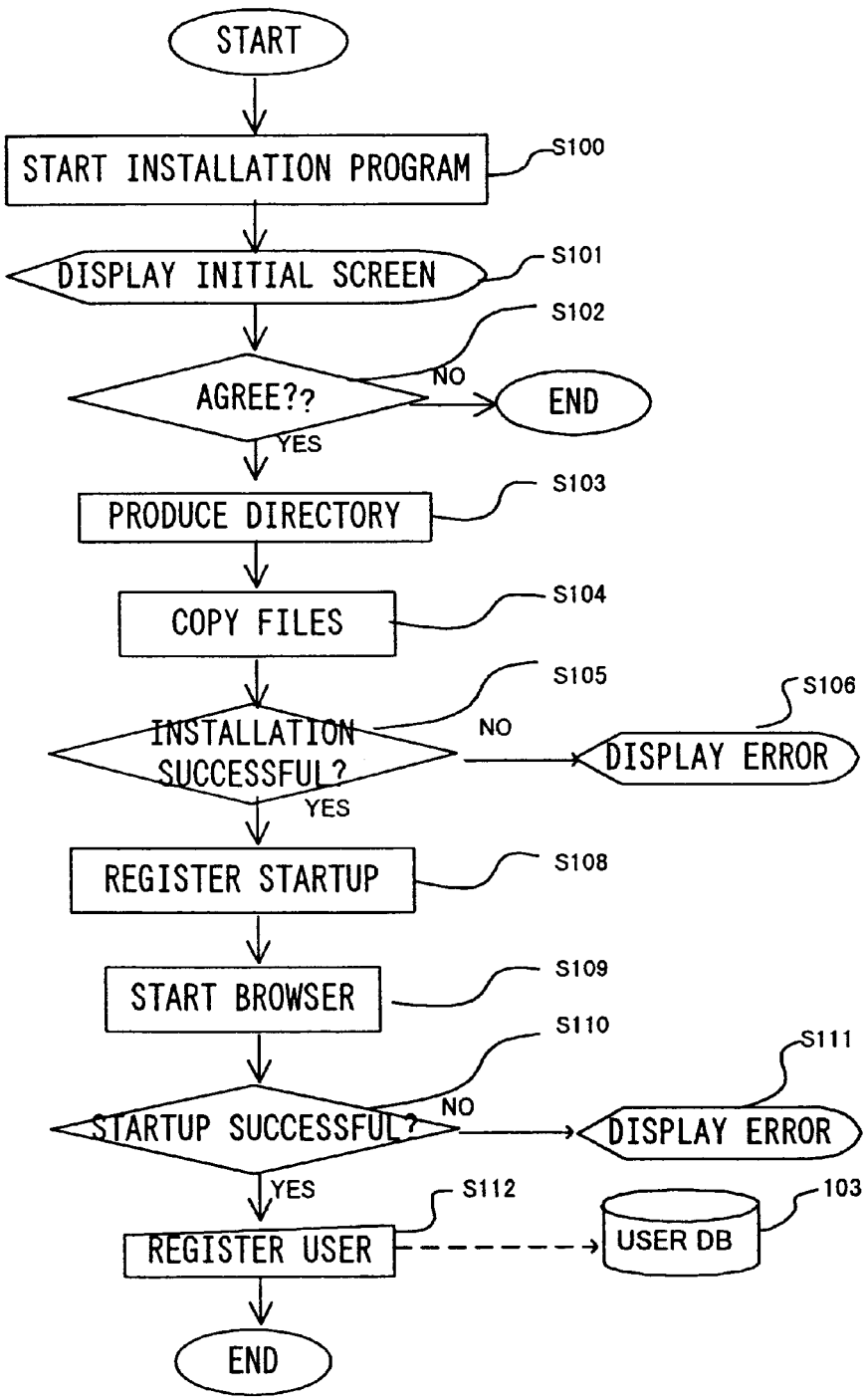
FIG. 5 is a flowchart describing an installation process.

The procedures for installing the notification information display program of the present invention in a user computer system are described with refer to FIG. 5 and FIG. 1.

The user takes the floppy installation disk for the notification information display program of the present invention that was included with a magazine or purchased outright, loads it into the user computer, and starts the installation program (S100, FIG. 5). This program installation process is performed for all user computers forming a user group. In the installation program, therefore, it is desirable to generate a display that will encourage the user to install the program in other computers also with which it is desired to exchange messages.

When the installation program is executed, an initial screen is displayed which asks the user whether or not he or she agrees with the terms of utilization appearing on the display device 211 (S101, FIG. 5). If the user does not agree with those terms (NO in S101, FIG. 5), the installation program terminates. If the user does agree (YES in S101, FIG. 5), a directory for the installation computer is created on the hard disk 206 (S101, FIG. 5), and the necessary files (cf. FIG. 3) are sequentially copied (S104, FIG. 5). If information needs to be entered for user registration, an entry screen is displayed and the user enters that information.

Once the file copying and file generation have been completed, installation success or failure is determined. If the installation fails (NO in S105, FIG. 5), an error message is displayed (S106, FIG. 5). If installation is successful (YES in S105, FIG. 5), an icon is registered on the start-up menu of the operating system (S108, FIG. 5). At that point, the computer system recognizes a sponsor identifier that specifies a sponsor that should be used for that system, and that identifier is stored in the computer registry. The sponsor identifier stored in this registry is compared against the sponsor identifier in the label information when new label information is introduced, and a determination is made as to whether or not that label is to be used.

It is also possible to perform all of the initial settings up to this point via the internet. In that case, as noted under S1 in FIG. 1, the user activates a browser on the computer for connecting to the internet, and a connection is made to a website provided by the delivery system 1. If a request is made at that website to download the files associated with the notification information display program, the same files as are provided on floppy disk are stored on the hard disk 206 of the user computer system. After this download, the user may decompress the compressed download program on the hard disk, using either publicly know technology or self-decompression, and generate the installation program. By executing that installation program, the user can establish the same environment as by installation from floppy disk.

After icon registration, the installation program connects that notification information display apparatus 200 to the delivery system 1 and asks the user to perform user registration. The website viewing browser is automatically activated, and a website provided by the delivery system 1 is connected to (S109, FIG. 5). Should browser activation fail for some reason (NO in S110, FIG. 5), an error is displayed. When browser activation is successful (YES in S110, FIG. 5), the delivery system 1, at that website, displays an input screen for registering user-specific information in the notification information display apparatus. When the user responds by entering his or her name and mail address, etc., the CPU 201 of the notification information display apparatus transfers this information as a user-specific information file to the server 100 (S2, FIG. 1). This notification information display program is installed in a plurality of computer systems in the user group 2, and operated as notification information display apparatuses 200a, 200b, 200c, etc. Reciprocal communications are performed according to the protocol between these notification information display apparatuses 200, and message information is sent and received, etc. (S3, FIG. 1).

When user-specific information is supplied from a new user, the server 100 registers that information in the user data base 103 (S112, FIG. 5). The server 100 also queries the user computer via the internet on whether or not news delivery is desired. The response of the user to this query is also stored in the user data base 103.

After the installation, the user may download any label information, etc., from the delivery system 1. When a sponsor change occurs, as when the contract with a sponsor expires, etc., it is possible to download label information and advertising information provided by a new sponsor from the delivery system 1. It is of course also permissible to provide information in a form involving reinstallation from a floppy disk or other recording medium.

Notification Information Display Operation

Figure 6:
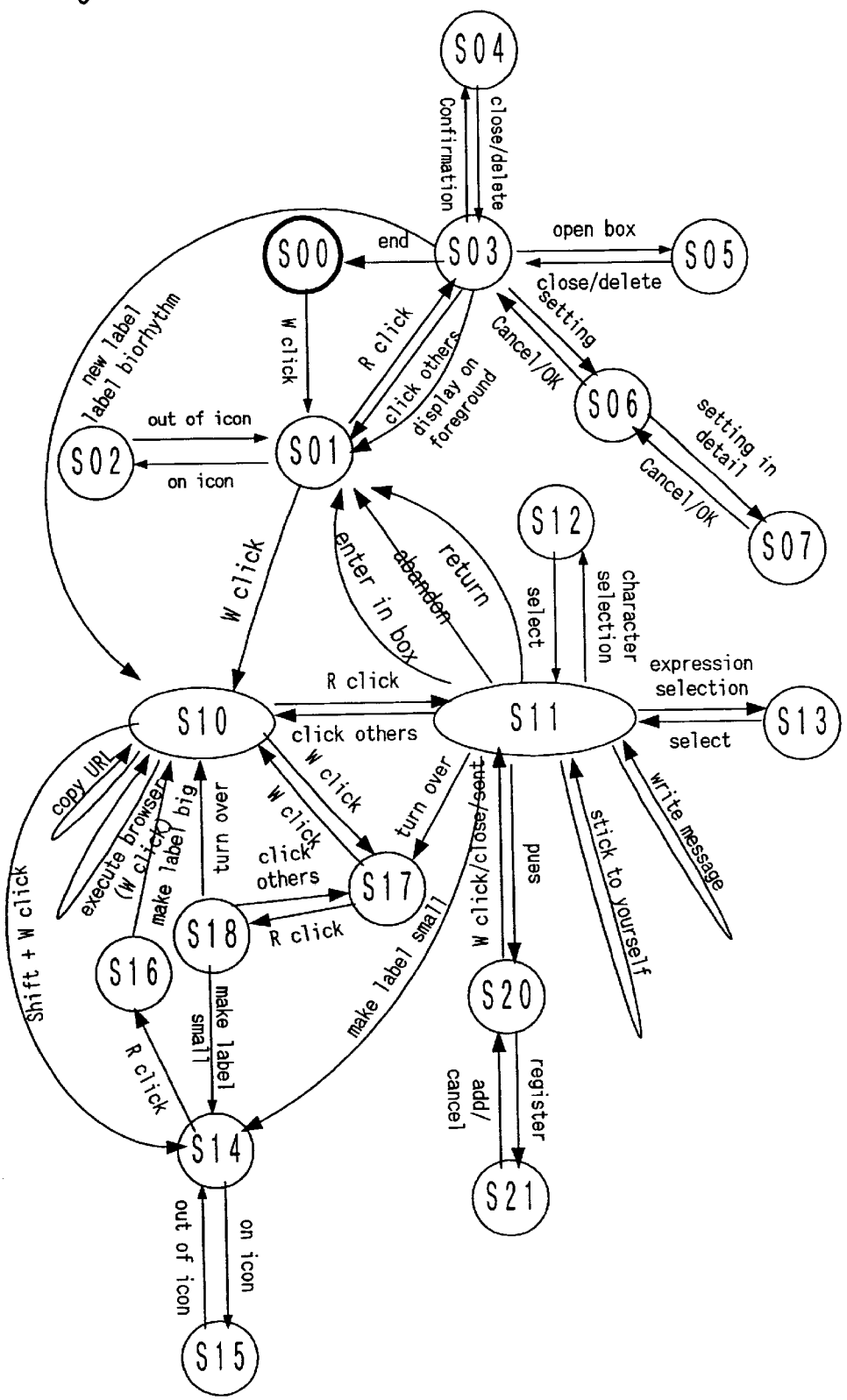
FIG. 6 is status transition diagram describing the operation of the notification information display apparatus of the present invention.

When registration has been performed by the installation processing described in the foregoing, the user computer will operate as the notification information display apparatus of the present invention. The operation of this notification information display is now described making refer to the screen status transition diagram in FIG. 6 and to the display image examples in each status presented in FIG. 7–24.

Figure 7:
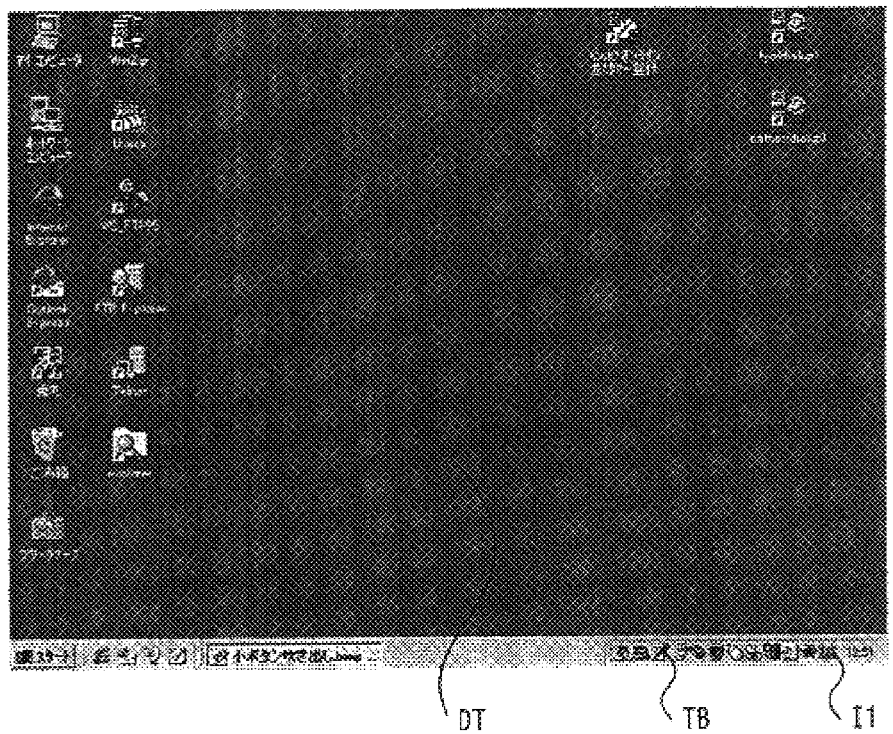
FIG. 7 is S01: example of image display after task bar registration.

Task Bar Registration (S01): When from the S00 status after notification information display program registration the user employs a mouse or other input device 210 to start the program (double-click), the program icon is registered on the task bar (FIG. 7). More specifically, an icon I1 simulating a character figure that is a symbol for the notification information display program is displayed on the task bar TB at the bottom of the desktop DT. Every time this icon I1 is selected (double-clicked on), a new label is generated and displayed on the desktop DT.

Figure 8:
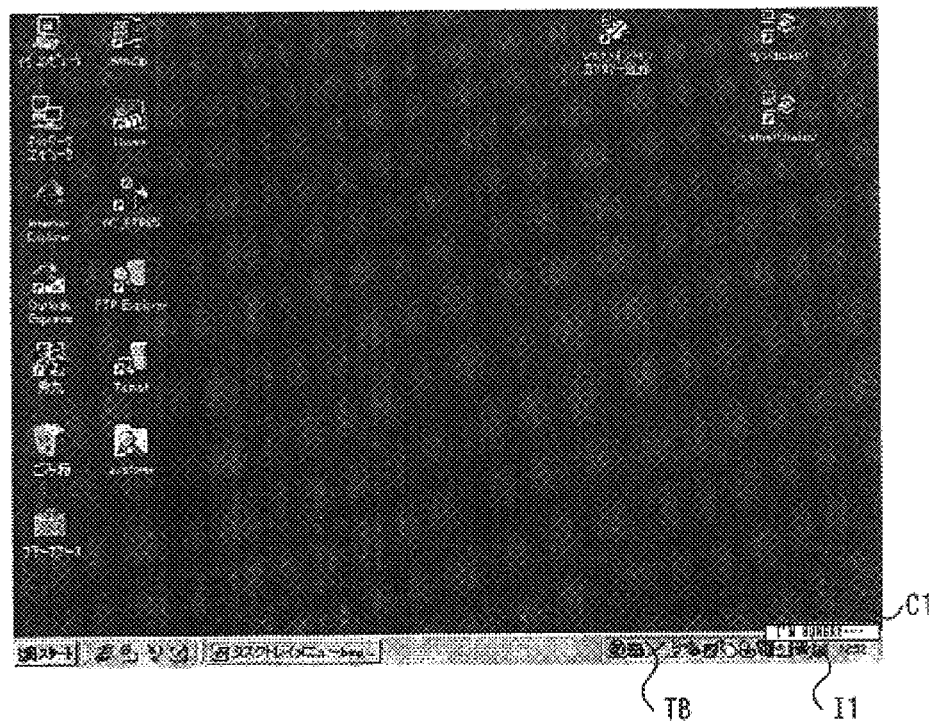
FIG. 8 is S02: example of task bar pop-up display.
Figure 9:
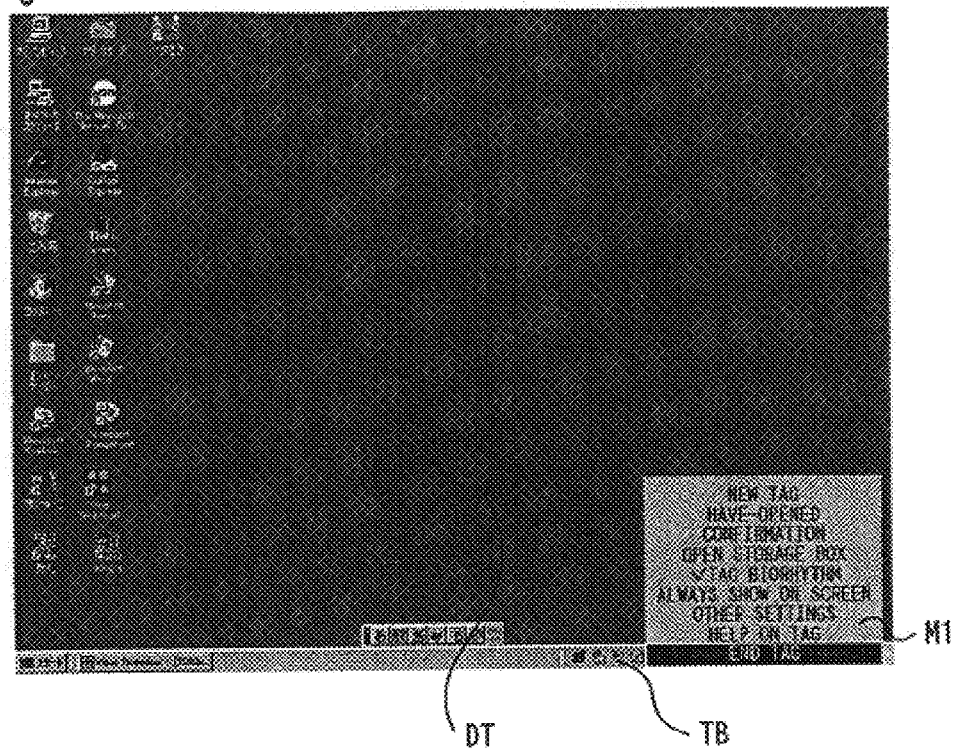
FIG. 9 is S03: example of task bar menu display.

When the user employs the input device 210 and places the cursor over the icon I1, the CPU 201 detects that, accesses a muttering file, and displays a dialogue line C1 in the vicinity of the icon I1 (status S02, FIG. 8).

Menu in Task Bar (S03): When the user double-clicks with the cursor over the icon I1, a pop-up menu M1 is displayed (status S03, FIG. 9).

Figure 10:
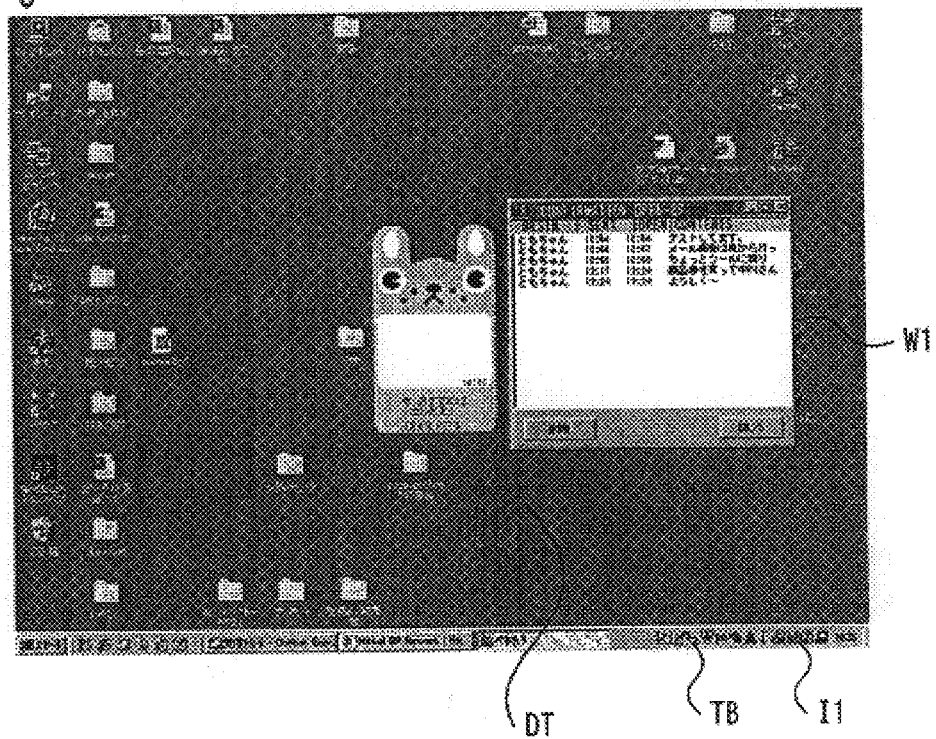
FIG. 10 is S04: example of have-opened verification window.

When "confirm have-opened" is selected from the pop-up menu M1, a have-opened confirmation window W1 is displayed to indicate whether the message information sent to that point in time from the notification information display apparatus has been opened or not (status S04, FIG. 10). In this window are displayed the transmission times and opening times for message information sent in the past, together with the message content and destination. The transmission time is the time the message information was sent as recorded by the notification information display apparatus. The opening times are recorded by the notification information display apparatus when opening information is received indicating that certain message information was received and referred by one or more of the notification information display apparatuses described earlier, and sent therefrom with that timing.

Figure 11:
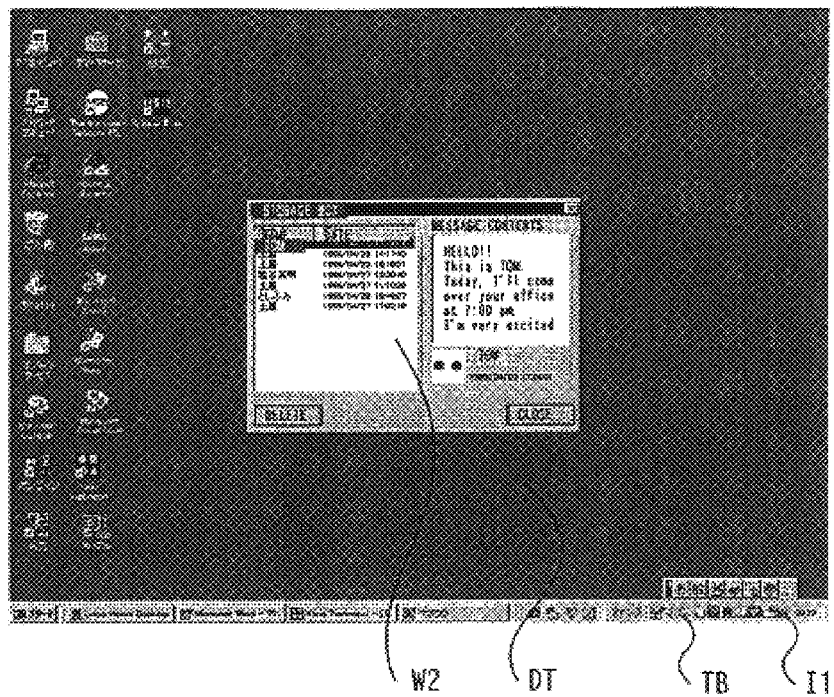
FIG. 11 is S05: example of storage box window display.

When "open storage box" is selected from the pop-up menu M1, by designating that a previously produced message or a message sent from another notification information display apparatus is to be received into the storage box from the S11 status, a storage box window W2 for the message received is displayed (status S05, FIG. 11). The contents displayed in this window W2 are displayed by searching for and extracting that information designated to be received, from among message information stored in the notification information display apparatus. The information displayed in this window W2 includes the message producer (sender), production date, message content, and selected facial expression, etc., thus making it possible to comprehend at a glance the content of the label. A delete button is displayed in this window W2. When the user selects the delete button, all of the label information relating to the message designated is thereupon deleted.

Figure 12:
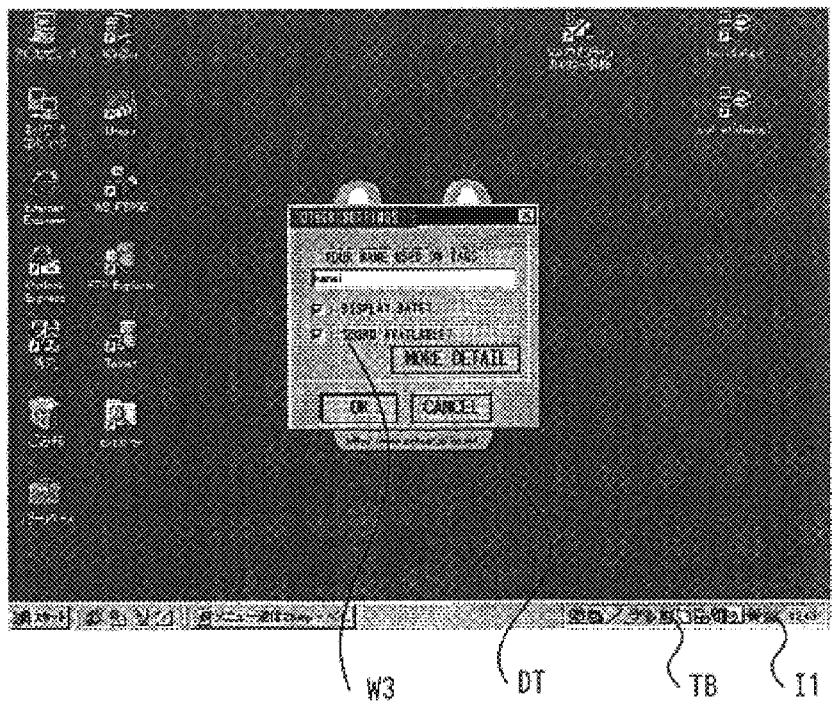
FIG. 12 is S06: example of other settings window display.
Figure 13:
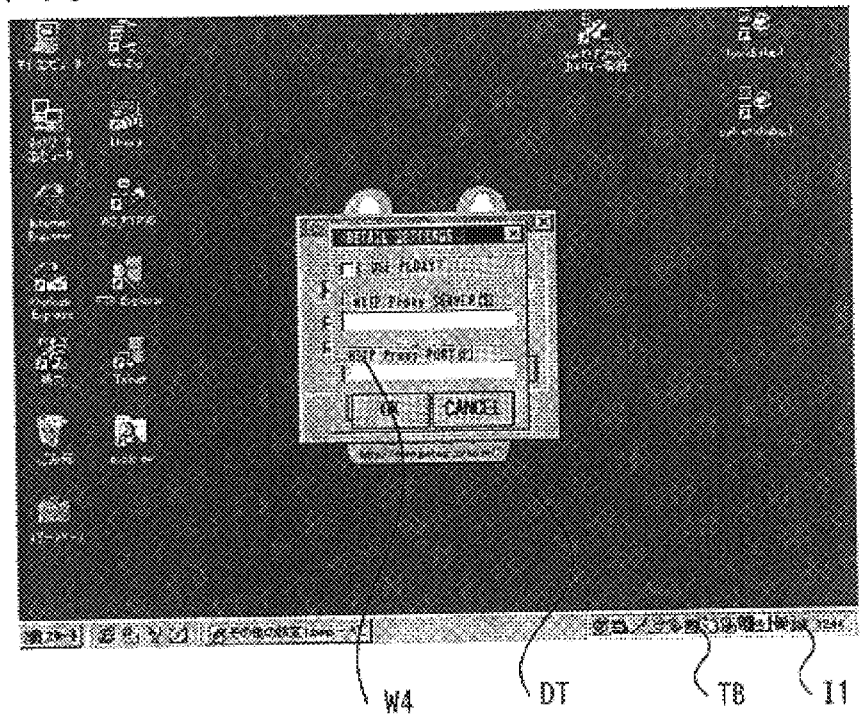
FIG. 13 is S07: example of detailed settings window display.

When "set" is selected from the pop-up menu M1, a setting window W3 is displayed (status S06, FIG. 12). Using this window W3, the user can set the user name to be shown in the label, whether or not to display the date and time, and whether or not to enable sound effects. When "more detailed settings" is selected from the window W3, a detailed setting window W4 is displayed (status 07, FIG. 13). From this window W4, the user can set whether or not to use proxy data, a proxy server name, and a proxy port.

It is also possible from the pop-up menu M1 to display the version of the notification information display program being used and help information.

Label Display (S10): When the user moves the cursor over the icon I1 and double-clicks, a label definition file is read out for the character figure that is set so that it will be displayed first, and the label front side image I2 is displayed in the initial position, such as in the center of the desktop DT (status S10, FIG. 14). At the same time, a label information file (peta.dat) is generated and given an association in order to record a display position or message information to be recorded in that label. For the label front side facial expression to be applied to that label, a default facial expression (such as an ordinary facial expression) is selected. In the S03 status, moreover, a new label is produced in like manner, even when new label or label biorhythm is selected from the pop-up menu M1. When label biorhythm is selected, a user birthday input window is displayed. When the date of birth is entered, text is generated to indicate the user's physical condition, feelings, intelligence, and calendar days to beware of, as based on publicly known technology using a biorhythm table or the like, and a label is displayed wherein are recorded those data as message information.

When the label is displayed, the notification information display apparatus compares the sponsor identifier contained in the label information against the sponsor identifier stored in the registry. When these two identifiers match, the notification information display apparatus displays that label. If the two identifiers do not match, the display of that label is disabled. In the case of label information to which is attached an identifier that involves no sponsor restriction, a general purpose label is indicated, wherefore the notification information display apparatus displays that label. By employing such a configuration as this, it is possible to display sponsor-designating labels apparatus by apparatus.

The notification information display apparatus is configured so that it calculates the total number of label images produced. When the total number of labels used by a user reaches a predetermined standard number, the notification information display apparatus reads out a prescribed message which is displayed in conjunction with the label. This standard number may be any number that is to constitute a division, such as 100 or 1000. The prescribed message might be "Thank you for 100 uses. We are always at your service." In addition to such a text display, the prescribed message may also include images and/or audio.

A cursor is displayed in the message display column A1. In the user-specific information column A2 is displayed the user name recorded in the user-specific information file from the pop-up menu M1, together with the current date and time. In the advertising text display column A3 is displayed a character string corresponding to the advertising text file. In the URL display column A4 is displayed either a URL address or a character string associated with a website to be linked to (saying "click here," for example).

When the user enters text characters using the keyboard or other input device 210, text characters passed to the notification information display system by the language input system of the computer are displayed in the message display column A1, and simultaneously stored in a message information file. When the user clicks the right mouse button to designate a character string range on the message input column A1, a menu is displayed, from which copy, cut, or paste can be selected, and from which the attributes (color, etc.) of the characters can be altered using the control key. The label image can be moved by placing the cursor on any part of the label and dragging it.

When the cursor is placed on the advertising text display column A3 or URL display column A4 and double-clicked, the website viewing browser is called up, and the website indicated by that URL is connected to in accordance with the address information set in the URL character string. If the address of a home page established by the sponsor providing that advertisement is designated beforehand as the URL or IP address to be passed to the browser, it becomes possible to present one's own company's advertisement by a simple operation performed by the user next to where the message is written.

When the right mouse button is clicked on the advertising text display column A3 or the URL display column A4, the URL is copied to the clipboard. In the case of a computer system in which no URL link has been set, after running the browser manually, this URL copying function can be used by the user to view the website at that URL.

Label Display Menu (S11): When the cursor is placed over the character figure display column A0 and the right mouse button is clicked, a pop-up menu M2 is displayed (status S11, FIG. 15). From this menu M2 can be selected the operations of character figure selection, facial expression selection, reversal, minimization, storage box reception, multiple transmission modes, property display, and deletion.

Figure 16:
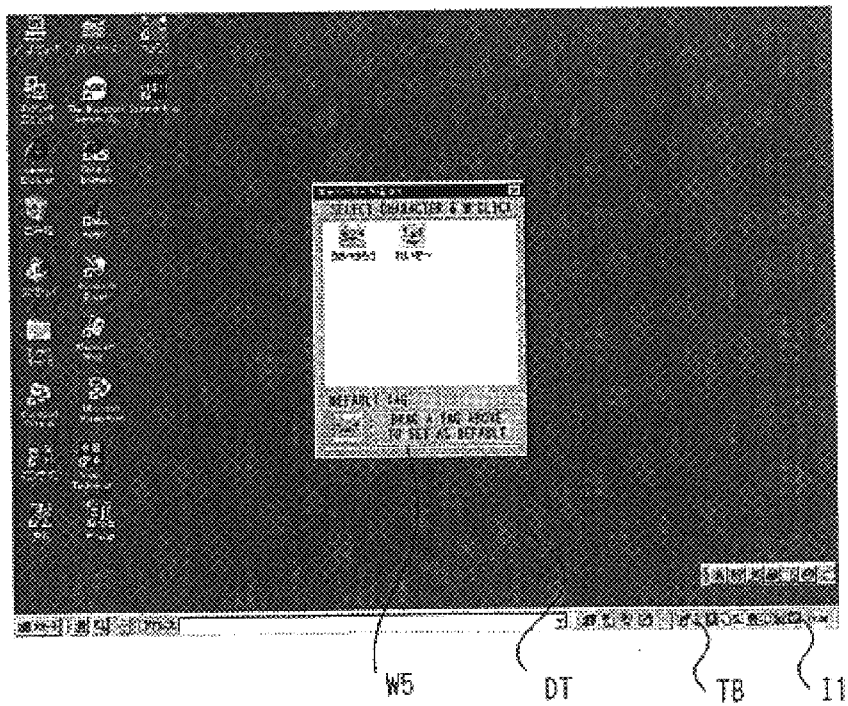
FIG. 16 is S12: example of character figure selection window display.
Figure 17:
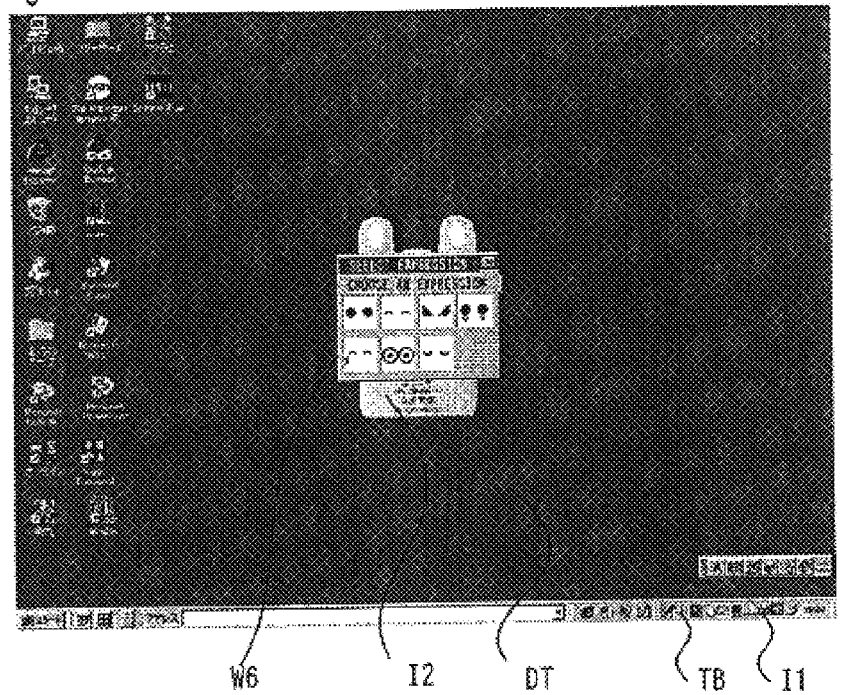
FIG. 17 is S13: example of expression selection window display.
Figure 18:
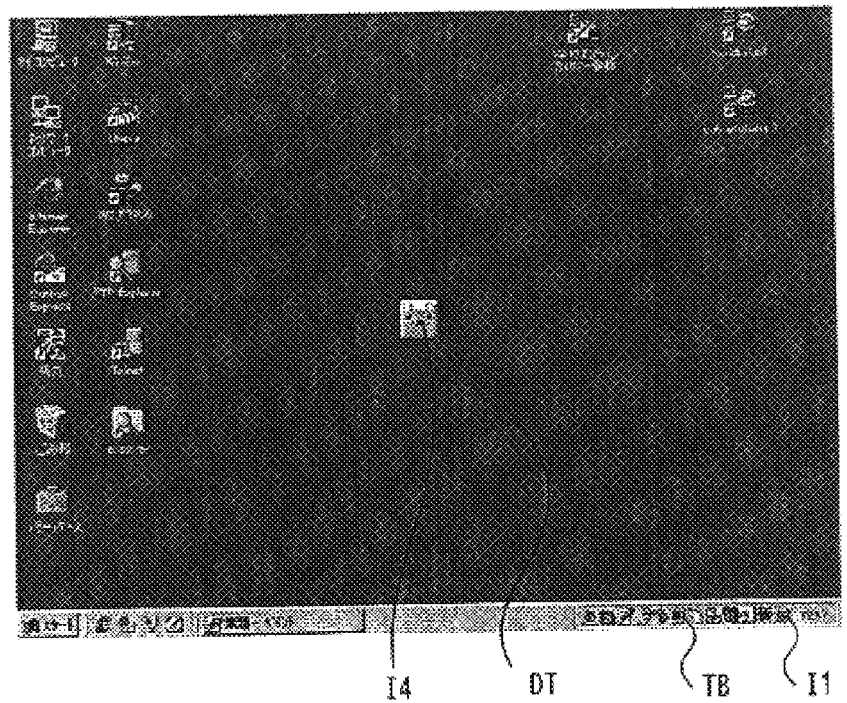
FIG. 18 is S14: example of minimized icon display.

When "character figure selection" is designated from the pop-up menu M2, a label selection window W5 is displayed for selecting the label type (status S12, FIG. 16). The notification information display apparatus searches for the registered label information and displays the registered label icon in the window. In the display example, two types of label are registered. When the user places the cursor over the desired label icon and double-clicks, the label information corresponding to the selected icon is read and the label image correspond to that label information is displayed. What is altered is only the label definition file containing the label image data. The label information file (peta.data) defining the message information, facial expression, position, and other attributes is not altered, wherefore the message, facial expression, and position, etc., in effect for the label prior to alteration are retained as is. Below the label selection window W5 is displayed the icon for the character FIG. displayed initially when newly produced. When the type of character figure displayed initially is to be changed, the user clicks on the icon of the desired character figure displayed in the window W5 and drags it onto the newly produced icon below. The notification information display apparatus, when the new character figure icon is so dragged, changes the newly produced icon display to the character figure icon dragged.

The label information (label definition files) pertaining to these icons and label images can be additionally obtained by connecting to the delivery system 1 and downloading the desired label information into the notification information display apparatuses 200x. Every time new label information is obtained, a new icon is added in the label selection window W5, so that the new label image can be used by clicking on the new icon.

Facial Expression Selection Process (S13): When "select facial expression" is designated in the pop-up menu M2 (FIG. 15), a label front side facial expression data group is read out from the label definition file and a facial expression selection window W6 is displayed (status S13, FIG. 17). When the user places the cursor over a desired facial expression selected from those displayed in the window W6 and double-clicks, the selected facial expression data are read. The notification information display apparatus displays those facial expression data in the character figure facial expression column A0 in the label front side image. Thus the selected facial expression is displayed in place of the previous facial expression.

Miniaturizing Process (S14): When "make small" is selected from the pop-up menu M2 (FIG. 15), minimized image data are read out from the label definition file, and a miniaturized icon I4 is displayed in place of the label front side image I2 (status S14, FIG. 18). The position information contained in the label information corresponding to that label is used, so the display position of the icon I4 does not change. This icon miniaturizing process is useful when wishing to make the size of the label smaller on the desktop DT in the interest of neatness.

Figure 19:
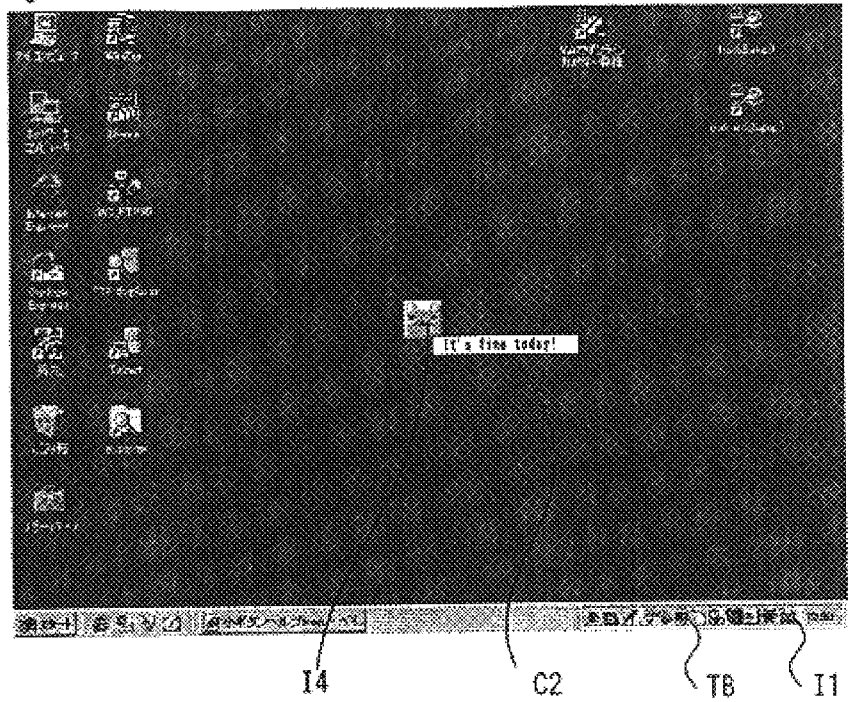
FIG. 19 is S15: example of pop-up display with minimized icon.

When the cursor is placed on the miniaturized icon I4, the CPU 201 detects that the cursor is positioned on the icon, reads out message information associated with that label, and displays a message C2 that is a prescribed number of characters in the first line of that message (status S15, FIG. 19). Thus, even when multiple labels are miniaturized to effect neatness, the content of the label associated with that icon can be discerned merely by the user placing the cursor over the miniaturized icon.

Figure 20:
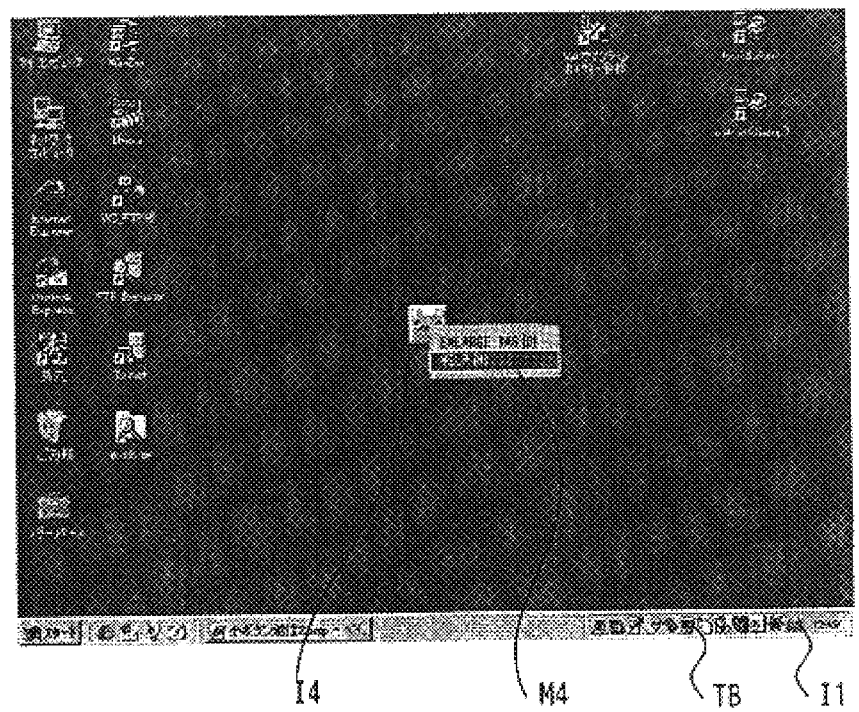
FIG. 20 is S16: example menu display with minimized icon.

When the user places the cursor over the miniaturized icon I4 and clicks the right mouse button, a pop-up menu M4 is displayed (status S16 is FIG. 20). By selecting "make large" from this menu M4 or double-clicking on the miniaturized icon, the maximized display, that is, the label front side image I2, is again displayed.

Figure 21:
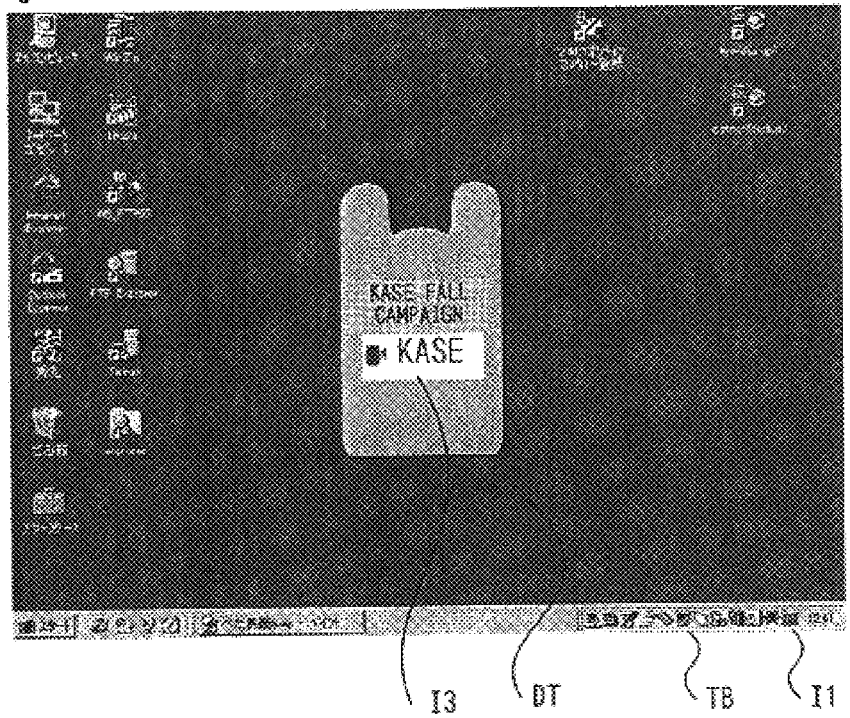
FIG. 21 is S17: example of label back side image display.

When the user selects "turn over" from the pop-up menu M2 (FIG. 15) displayed by the label front side image or double-clicks on the character figure display column A0, the notification information display apparatus refers the label definition file, reads the label back side image data, and displays a label back side image I3 in place of the label front side image (status S17, FIG. 21). There is no alteration in the label information file (peta.dat), wherefore the label back side image is displayed in the same position as the label front side image. By referring an advertising image file, advertisement text and advertisement images are displayed in the label back side image I3.

Figure 22:
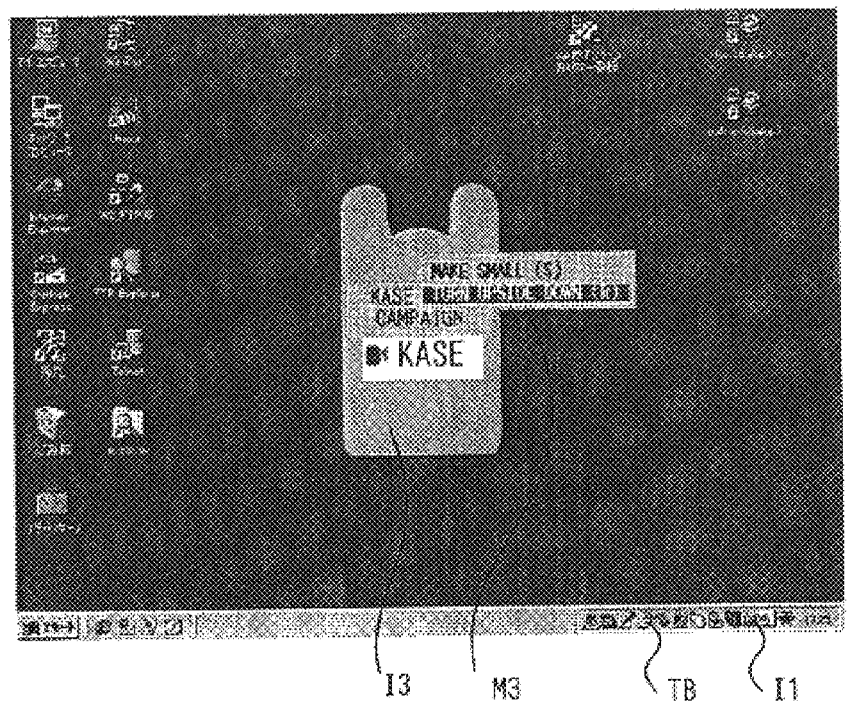
FIG. 22 is S18: example of menu display with label back side image.

When the user places the cursor over the label back side image and clicks the right mouse button, the pop-up menu M3 is displayed (status S18, FIG. 22). If the user here selects "make small," the miniaturized icon is displayed (status S14, FIG. 18). If "turn upside down" is selected, the label front side image data are again read from the label definition file and the label front side image I2 is displayed (status S10, FIG. 14). Every time the user double-clicks on the label, the display is toggled back and forth between the front side image and back side image of the label image.

When the user selects "storage box reception" from the pop-up menu M2 (FIG. 15), the notification information display apparatus receives message information associated with that label into the storage box. More specifically, the notification information display apparatus sets a flag in the message information indicating that it is to be received into the storage column And the status S01 is reverted to wherein display of that label image is suspended. Subsequently, when "open storage box" is selected from the pop-up menu M1 (FIG. 9), the notification information display apparatus extracts the flagged message and displays a message list in the storage box format as indicated in FIG. 10.

From the pop-up menu M2 it is also possible to make selections to refer a help file, display properties, or delete the label itself (destroy the message information and suspend label display). When "paste to self" is selected from the menu M2, furthermore, the name registered to oneself is displayed in the user personal information character string A2. "Paste to self" is used when wishing to use the label as a memo to oneself.

Figure 25:
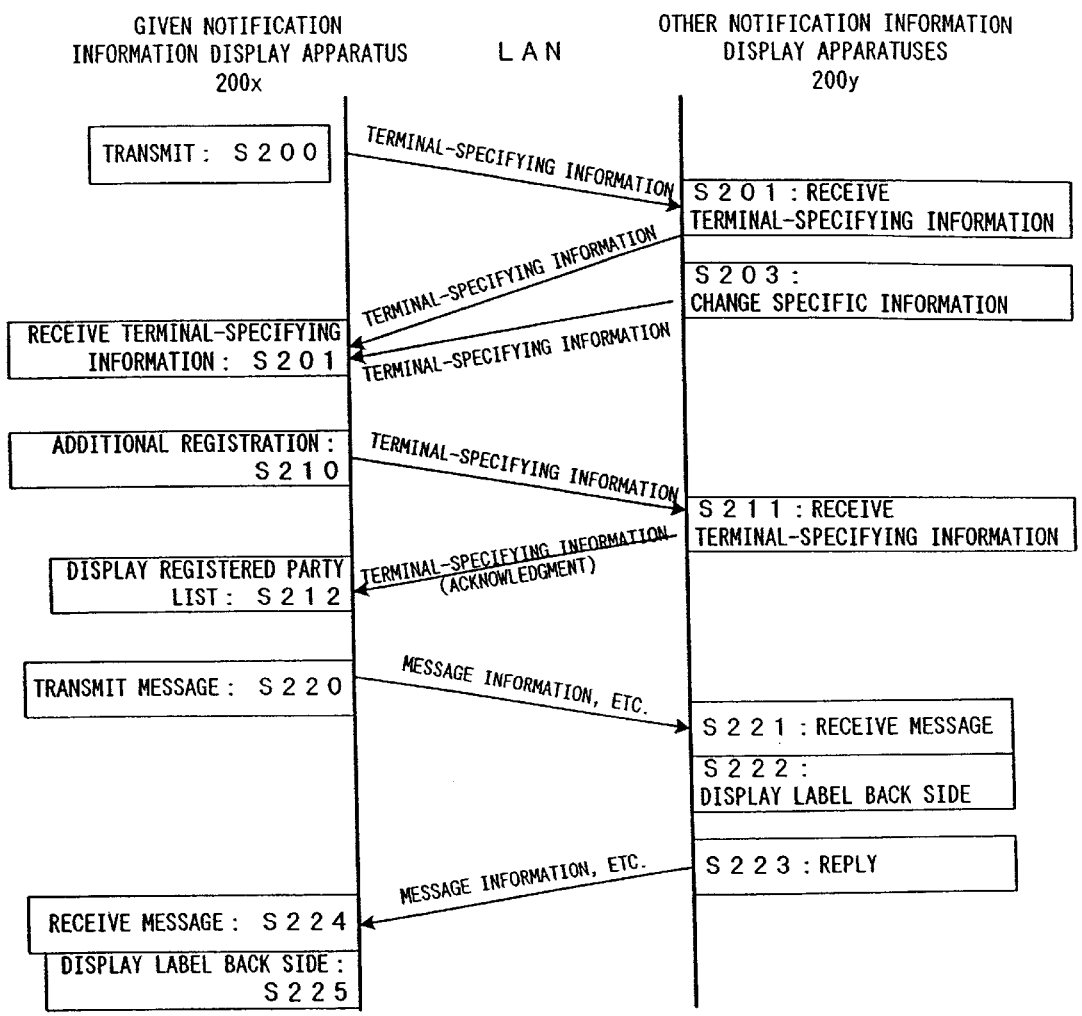
FIG. 25 is a sequence diagram for reciprocal communications between notification information display apparatuses.

Communication Processing: The details of intercommunications between multiple notification information display apparatuses 200 (S3, FIG. 1) are described with refer to the sequence diagram given in FIG. 25.

When a message needs to be sent to someone else, the user enters the message in the message display column A1, then displays the pop-up menu M2, and selects "past to someone else." The configuration (non-active status) does not allow this selection to be made for a received label or for a reply label for a received label.

Figure 23:
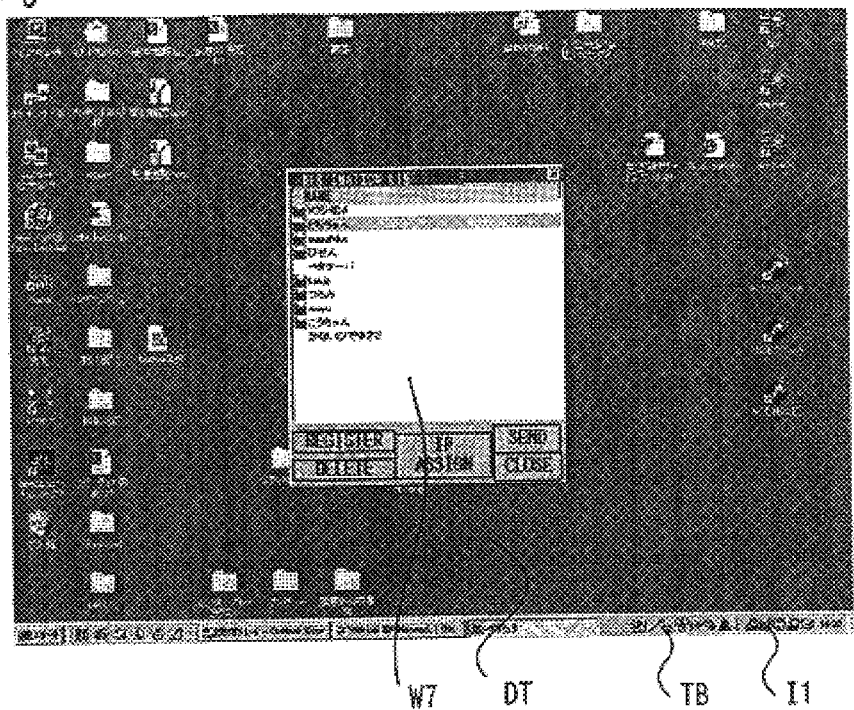
FIG. 23 is S20: example of sending window display.
Figure 24:
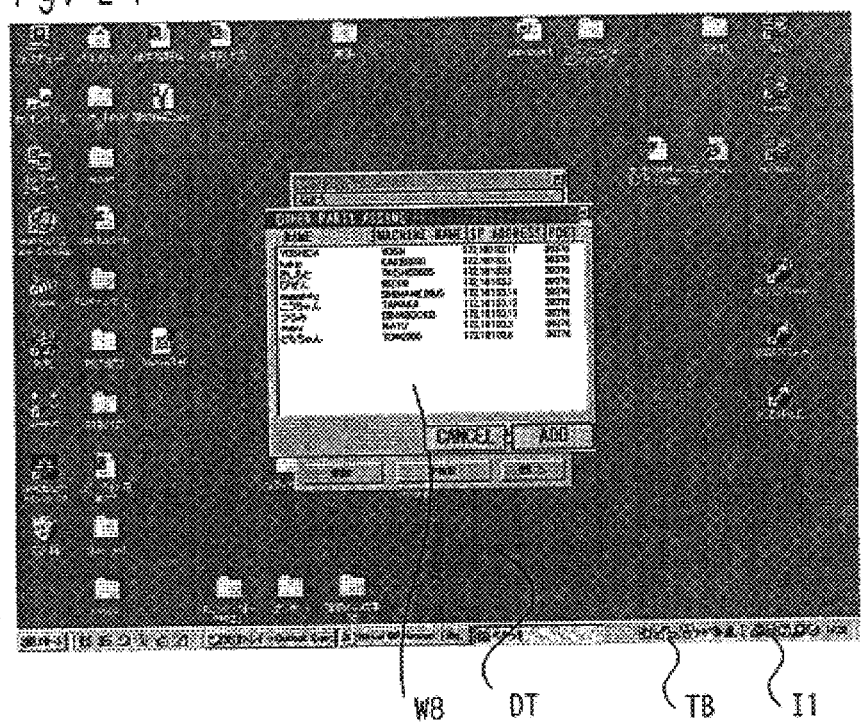
FIG. 24 is S21: example of sending destination registration window display.

When message transmission is selected, the destination list is read out, and a registered destination list window W7 is displayed (status S20, FIG. 23). All of the registered destinations are displayed in this window W7.

A particular notification information display apparatus 200x transmits terminal-specifying information for specifying that apparatus via a LAN at prescribed times to the other notification information display apparatuses 200y (where y is all the terminal apparatuses other than x) (S200). By prescribed times is meant at program start-up time (FIG. 8), when one's name is changed (FIG. 12), when registering a destination (FIG. 24), and when the program terminates. In response to this, the other notification information display apparatuses 200y are configured to transmit terminal-specifying information to specify themselves (S201). Should there be a notification information display apparatus which does not transmit back its terminal-specifying information, it has to be a terminal that is registered, but either the power thereto is not turned on, or the notification information display program is not running. The notification information display apparatus 200x, based on that terminal-specifying information received, specifies the other notification information display apparatuses 200y to which it is possible to transmit message information (S202). The notification information display apparatus 200x refers the destination list, attaches a specific icon to terminals at registered destinations to which transmission is possible, and displays the destination list window W7 (status S20, FIG. 23).

In the example depicted in FIG. 23, a specific icon is placed in front of the names of destinations to which it is possible to send. In order to indicate a non-active status for the destinations to which transmission is impossible, the notification information display apparatus 200x either changes the display color for those destinations, or dims the display thereof.

In cases where the user has made a setting to change a name or other specific information pertaining thereto used by that user, the notification information display apparatus 200x is configured to transmit terminal-specifying information containing that changed user-specific information to the other notification information display apparatuses 200y (S203). When the other notification information display apparatuses 200y that received this terminal-specifying information are in transmit mode, these other notification information display apparatuses 200y are configured to change the display of the destination name or other user-specific information in the destination list window W7 (S202).

When the user selects "register" from the destination list window W7, the notification information display apparatus 200x transmits the terminal-specifying information described above (S210). The other notification information display apparatuses 200y that receive this terminal-specifying information send back terminal-specifying information corresponding to an acknowledgment (S211). So long as the other notification information display apparatuses 200y are operating with the same communications protocol and running the notification information display program, they are able to send back the terminal-specifying information. The notification information display apparatus 200x, in order to specify the other notification information display apparatuses 200y that send back that terminal-specifying information, refer the terminal-specifying information, and display an other-party adding window W8 comprising names, IP addresses, machine designations, and port numbers (status 21, FIG. 24, S212).

If the user, selects "add" from the window W8 after selecting an apparatus to be registered (by reversing the display, etc.), the window W8 disappears and the window W7 is displayed with the selected destination added in the list menu thereof. The added destination is added to the destination list.

By selecting the "delete" icon from the window W7, any registration can be erased from the destination list.

When the user selects a destination from the destination list window W7 to which it is desired to make a transmission and either double-clicks or selects the "transmit" button, the notification information display apparatus 200x transmits message information corresponding to that label to the selected notification information display apparatus 200y (S220). At that time, a label definition file name is added as information to specify the label type. A number specifying a facial expression is added as information to specify the facial expression of the character figure.

The other notification information display apparatuses 200y, upon the transmission of information such as message information (S221), refer the label definition file name attached to the message information and determine whether or not the same file is registered in that notification information display apparatus. When the designated label information is registered, that label definition file is used, and when the designated label information is not registered, the label definition file designated as the default is read out. The notification information display apparatus, using the label back side image data read out, first displays the label back side image I3 in the prescribed position (status S17, FIG. 21, S222). Audio data may be used at this time to generate a sound to indicate that a transmitted message has arrived. It is also permissible to employ a moving image display (animation) by changing the size of the icon I1 in the task tray in a time sequence.

The point where the back side of the label is first displayed is important. That is, with the label image of this embodiment aspect, the trademark image and advertisement text that make up the main part of the advertisement are deployed on the back side, wherefore the attention of the user who has received a message is first drawn to the advertisement information. In other words, just as with a commercial broadcast on television, the advertisement display is presented unilaterally, and the user who wishes to see the content of the message can be made continually aware of the advertisement.

Figure 14:
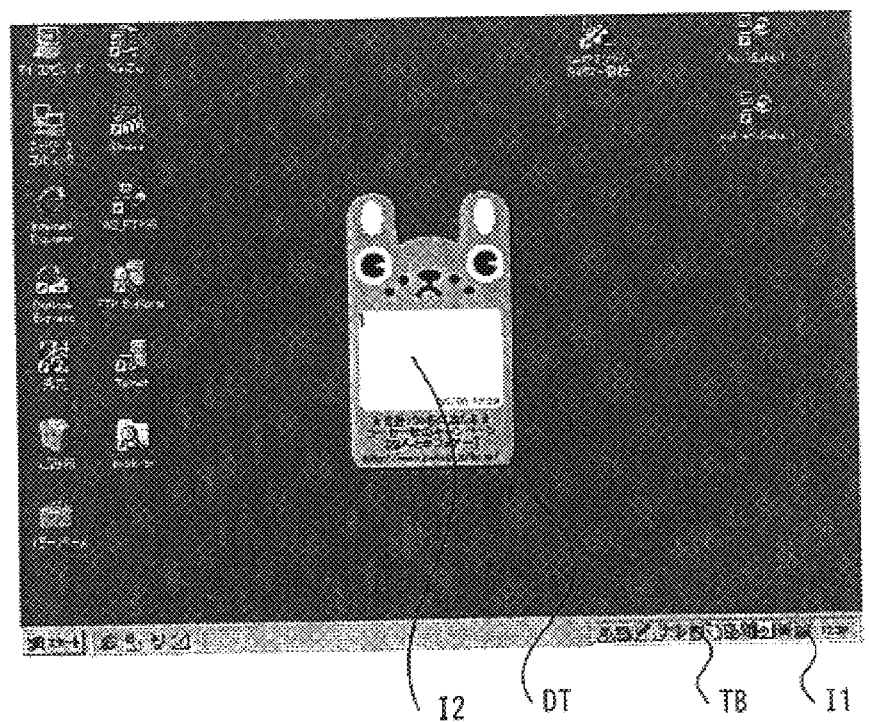
FIG. 14 is S10: example of label front side image display.
Figure 15:
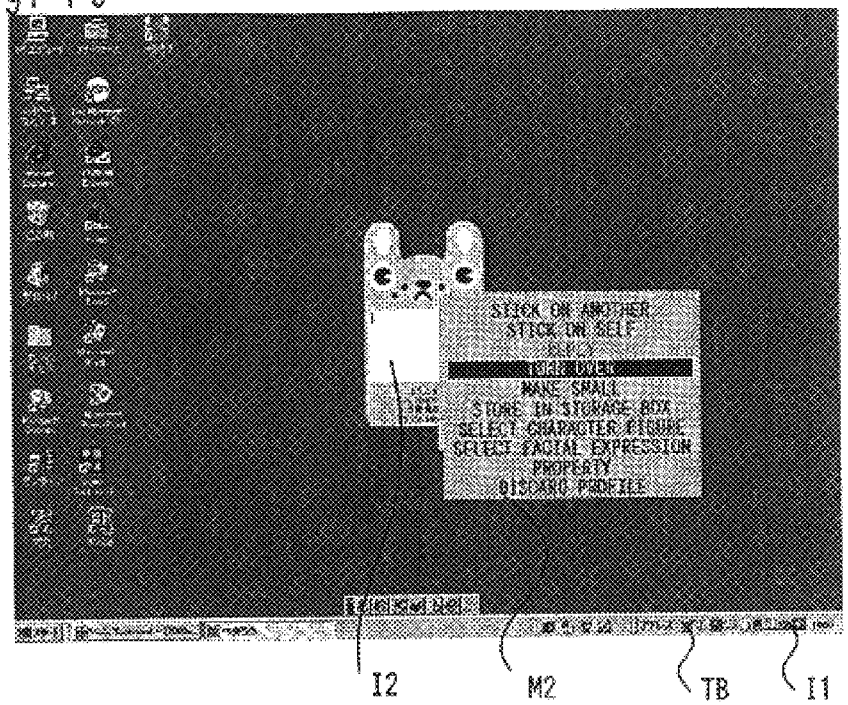
FIG. 15 is S11: example of label front side image menu display.

A user who is aware of the advertisement on the label back side image I3 either right-clicks to display a menu and selects "turn upside down" from the menu, or moves the mouse pointer over the label and double-clicks to display the label front side image I2 (status S10, FIG. 14). In the message display column A1 on the label back side is displayed a character string based on a message information file received, that is, based on message information wherein text produced by a sender has been sent. Also, the sender's name is displayed based on user-specific information received, as the user-specific information character string A2, together with the time of transmission. Further advertising display is effected with the advertising text display column A3, etc.

When the user has replied to a message received, the pop-up menu M2 (status S11, FIG. 15) is displayed and "reply" is selected (S223). This reply selection is only valid for a received label, and the configuration prevents this selection being made from a self-produced label. When "reply" is selected, another label front side image I2 is separately produced and displayed. If the user writes a message for this label, and replies in the same manner as described above, the message information will be received by the original notification information display apparatus 200x (S224), and the back side of the label image corresponding to the reply message will be displayed (S225).

Thus a user can select any label, and effect the display of messages and advertisements within the user group 2. Every time a message is transmitted or received, the number of labels used, sent, or received is accumulated in a user-specific information file in the form of historical information, together with time information. The number of registered destinations is also accumulated in the same file.

Advantages of First Embodiment Aspect

As based on this first embodiment aspect, in addition to the benefits noted for the invention, the following specific benefits are realized.

As based on this embodiment aspect, for example, it is possible to set up the environment in one operation from a floppy disk using the installation program, which is convenient for the user.

As based on this embodiment aspect, the configuration is made to facilitate label display on the WYSWYG operating systems which are widely and commonly used, wherefore, by being installed on many personal computers, effective advertisement is made possible.

As based on this embodiment aspect, the configuration is made so that a browser can be automatically called up, wherefore it is possible to obtain advertising information with the necessary timing.

As based on this embodiment aspect, the configuration makes it possible to change attributes such as character color, wherefore it is possible to exchange advertisements and messages while stimulating user interest.

As based on this embodiment aspect, the label can be made smaller, permitting the desktop to be neatly arranged. In addition, the first part of a message can be displayed by placing the cursor on the label, wherefore the label content can be previewed even when the display is minimized.

As based on this embodiment aspect, the back side which exhibits high advertising effectiveness is first displayed when receiving a message, wherefore a user wishing to read a message can be confronted with concrete advertising.

As based on this embodiment aspect, the label is given the form of a character figure, thereby making it possible to stimulate the interest of a user who likes that character figure. If the configuration enables the downloading of charming character figure labels, the user can be induced to use this system enthusiastically, even further enhancing the advertising effectiveness.

As based on this embodiment aspect, the mutterings of the character figure can be displayed merely by placing the cursor over the label, so that user interest can be stimulated.

As based on this embodiment aspect, whether or not a label can be displayed is determined by comparing a sponsor identifier assigned to the label information against sponsor identifiers stored in a computer registry, wherefore it is possible to display only those labels which a sponsor wishes used.

Second Embodiment Aspect

A second embodiment aspect of the present invention relates to a configuration wherewith it is possible to regularly download notification (advertising) information from a delivery system.

The configuration in this second embodiment aspect is the same as the configuration in the first embodiment aspect. However, in order to download advertising information from the delivery system 1 frequently, at least one of the systems in the user group 2 is configured so that it can be connected to the server 100 of the delivery system 1 by a dedicated line or dial-up connection.

Figure 26:
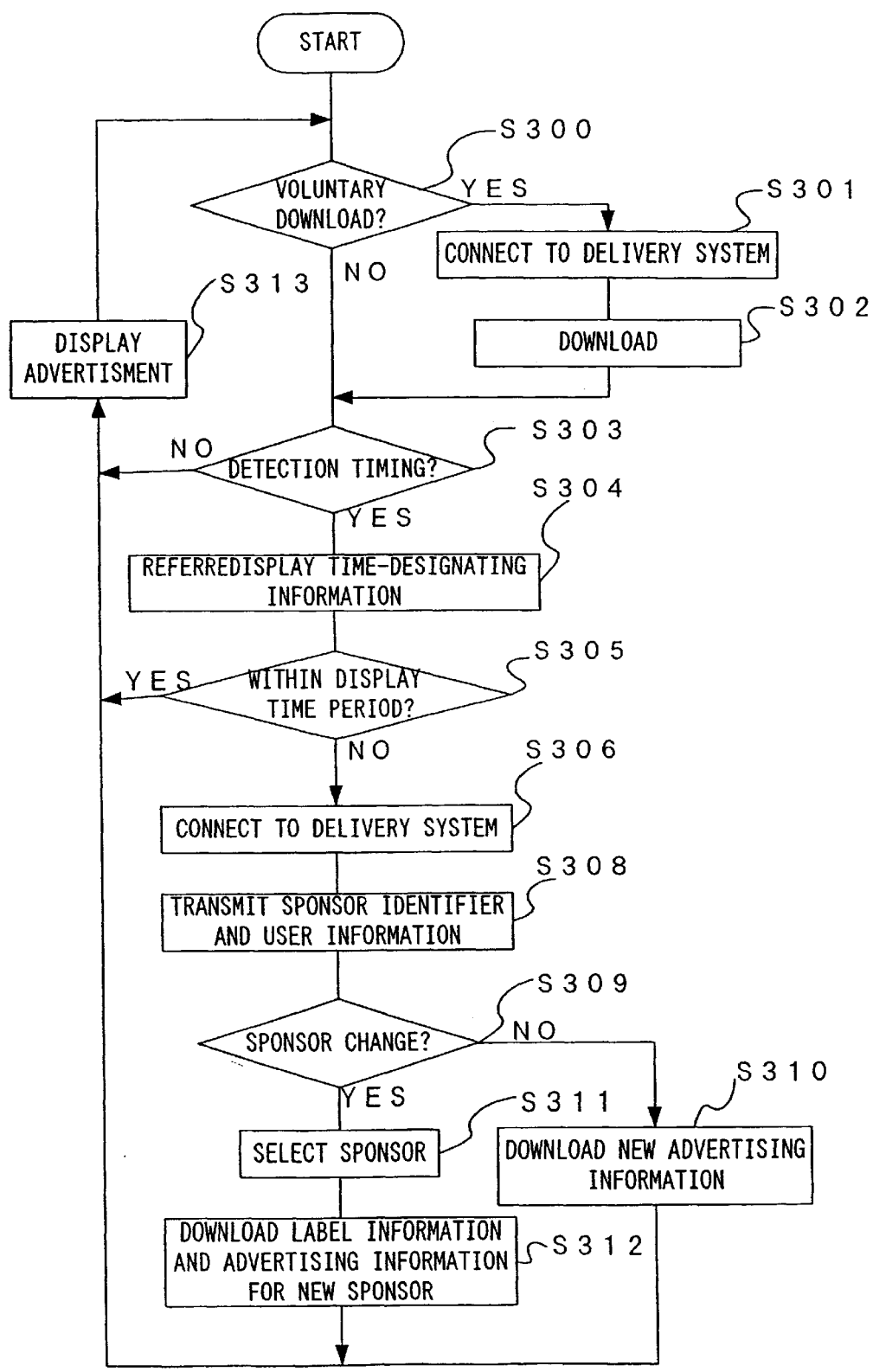
FIG. 26 is a flowchart that describes system operation in a second embodiment aspect.

The operation in this embodiment aspect is now described with refer to the flowchart in FIG. 26.

The operation in the notification information display apparatuses is the same as in the first embodiment aspect described earlier. This embodiment aspect is further configured, however, so that the latest advertising information or label information can be updated.

Free Acquisition of Advertising Information: When new label information is to be acquired at will (YES in S300), the user starts the browser in the notification information display apparatus 200x and connects to the delivery system 1 (S301). If the connection is successful, the user selects any label information from among a plurality of label information offered for download in a website provided by the delivery system 1, and effects download to the hard disk 206 of the notification information display apparatus he or she is using (S302). The downloaded label information is stored in the notification information display apparatus in the form of an installation program, and an icon therefor is displayed on the desktop. When the user clicks on this icon, the label installation program executes, new label information is generated, and the new icon is displayed in the label selection window W1.

Automatic Acquisition of Advertising Information: The notification information display apparatus 200x is configured so that, at a prescribed inspection times, it monitors display time designating information contained in the advertisement text file in the label information, that is, display start dates and times, and valid time limits (S303). When an inspection time is reached (YES in S303), the notification information display apparatus 200x refers display time designating information set in the advertising information associated with the label image currently displayed (S304). If the current time (date and time) obtained from the system is within the display time period designated by the display time designating information referred (YES in S305), the advertisement display based on that advertising information is continued without modification (S313).

If the current time has exceeded the display time period (NO in S305), the notification information display apparatus 200x connects to the delivery system 1 (S306), and transmits the sponsor identifier and the user-specific information (S308). The server 100 of the delivery system 1 determines whether or not the advertisement of the sponsor specified by that sponsor identifier is still within the contract period (S309). If that sponsor advertisement contract is still in effect (NO in S309), the server 100 transmits new advertising information containing the next advertisement display time designating information for that sponsor to the notification information display apparatus specified by the user-specific information. This advertising information is downloaded by that notification information display apparatus and the advertising information is updated (S310).

When the server 100 determines that the sponsor has changed (YES in S309), the browser in the notification information display apparatus 200x specified by that user-specific information is activated to permit viewing a website HTML file so that the user can select a sponsor. The user selects a sponsor from this website (S311). The server 100 transmits information necessary for the new sponsor advertising for the sponsor selected by the notification information display apparatus 200x (S312).

The information necessary for the new sponsor advertising refers to information comprising the sponsor identifier file, advertising image files, advertisement text files, label definition files, and muttering files for that sponsor and like that. The server 100 reads the advertising information from the advertising information data base 101, for example, and sends it to the notification information display apparatus 200x. In cases where the label information applied to that sponsor is defined, the server 100 reads out new label information from the label information data base 102 and sends it to the notification information display apparatus 200x.

In the notification information display apparatus 200x, the downloaded advertising information and label information are stored respectively in memory areas, and the new advertisement images and advertisement text are displayed (S313). Also, the sponsor identifier associated with the new sponsor is stored in the computer registry.

By means of the operations described above, advertisement display is continued so long as the advertisement display time period is in effect. When that advertisement time period has been exceeded, new advertising information is automatically downloaded, and, if the sponsor has changed, advertising information produced by a sponsor selected by the user is downloaded, and the advertisement display is renewed.

The processing described in the foregoing may be performed individually for each label or it may be performed commonly for all types of labels. When it is performed label by label, a plurality of advertising information will exist for a plurality of labels. Different advertisements will be displayed sequentially, at certain times, for each label. The server 100, by transferring a plurality of advertising information to the notification information display apparatus beforehand, can display the advertisement content according to the time frame and time period. The replenishment and display of advertising information can be continued without missing a time period even when the user does not voluntarily connect to the delivery system 1. In cases where advertising information is commonly downloaded for all labels, one set of advertising information is referred for all of the labels, wherefore the advertising content can be changed at the same time.

It is also possible to make the configuration so that the next advertising information is downloaded a certain period of time prior to the end of the advertisement display time limit. In that case, it is possible to start a new advertisement without fail from a designated date according to the wishes of the sponsor.

Instead of downloading new advertising information when the sponsor has changed, the service provider controlling the delivery system 1 may send to the user a floppy disk containing the information necessary to conduct advertising for a selected sponsor. The user would then load this floppy disk in the notification information display apparatus using the same procedures as when installing.

In the procedures described in the foregoing, the user is required to select the sponsor. However, if it is possible in terms of the contract for the service provider to unilaterally determine a sponsor, information necessary to the new sponsor advertisement may be automatically transmitted to a notification information display apparatus on the user end from the delivery system 1. If this is the configuration adopted, a sponsor can be changed without user involvement.

Embodiment

An embodiment of this notification information display system featuring automatic advertisement delivery and renewal functions, as described in the foregoing, is now described.

The display time for advertising information can be set as desired with the display time designating information, as a time period, time frame, or year, etc. This setting can be made freely so that, for example, the display will be made during a certain time frame every day, or only for a certain length of time, or for an entire year. In terms of the display mode, it is possible to make settings to change the character color, alter the character size, or display text so that it scrolls up. Information concerning the display mode is added to the attribute information at the time that advertising information is sent from the server 100 to the notification information display apparatus.

Figure 27:
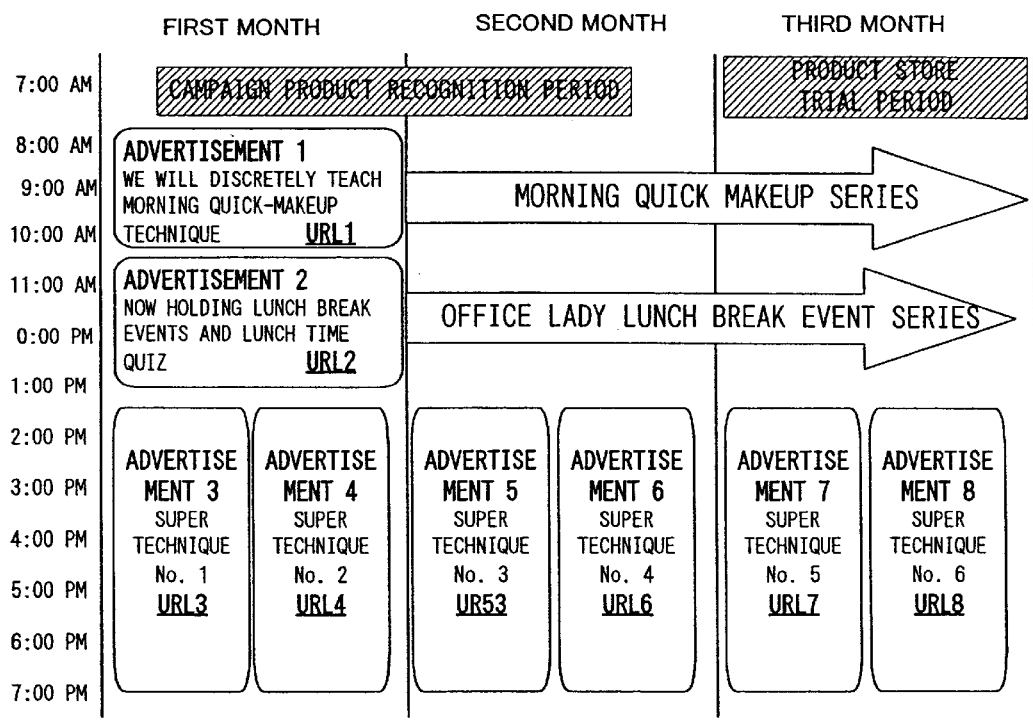
FIG. 27 is a time chart for establishing campaign advertising time periods in the second embodiment aspect.

In FIG. 27 is diagrammed an example of advertising display time settings for a product campaign in a case where the sponsor is a cosmetic manufacturer.

As based on this embodiment, the contract period with the sponsor's delivery system provider is three months. For two months after the new product first goes on sale, the delivery system 1, treating this as a campaign product recognition period, presents advertising information for introducing the campaign product to each notification information display apparatus in the user group. Then, treating the final month as a period for actually using the product at a store, advertising information is presented that is coordinated such trial use of the product at a store.

Advertisement 1 is based on advertising information for which the display time is limited to the morning hours. Advertisement 2 is based on advertising information for which the display time is limited to the noon hours. The advertising information display time is set so that advertisement 1 and advertisement 2 are continued throughout the entire contract period. For advertisements 3–8, it is only necessary to set the advertising information so that the advertisement content is changed every two weeks during the afternoon hours.

Figure 28:
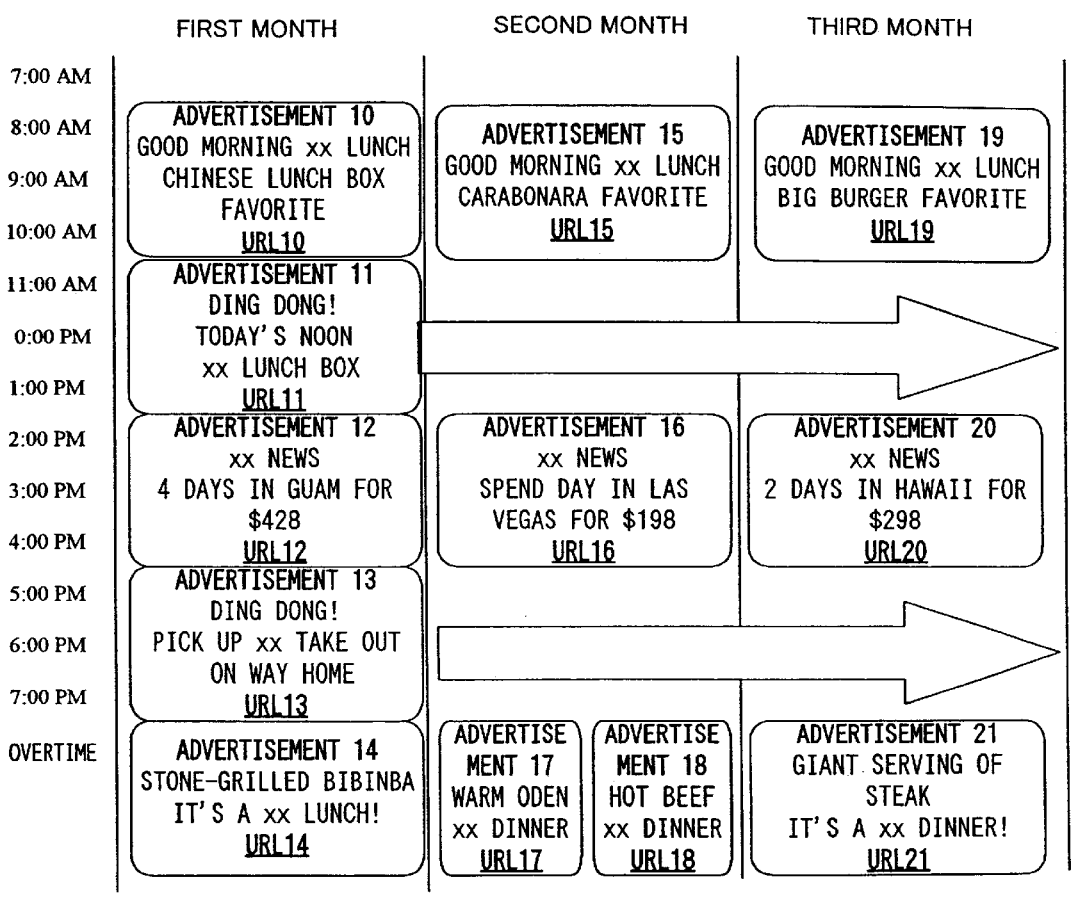
FIG. 28 is a time chart for establishing time-limit advertising time periods in a third embodiment aspect.

In FIG. 28 is diagrammed an example of display time settings for product advertising wherein advertising is conducted with time limits in a case where the sponsor is a convenience store chain. The time frames are divided between morning, noon, afternoon, evening, and night. The advertising information for the advertisements 10–21 need only be set so that products can be introduced which sell well during those respective time frames.

Advantages of Second Embodiment Aspect

As based on the second embodiment aspect described in the foregoing, in addition to providing the same benefits as the first embodiment aspect described earlier, it is possible to freely alter the advertisement content according to time. Hence it is possible to employ advertisements closely associated with certain times, bringing these to the attention of users during the most effective time frames.

As based on this second embodiment aspect, necessary advertising information can be added at any time, without the necessity of storing all advertising information in the user's computer beforehand.

As based on this second embodiment aspect, even should the sponsor change, advertising information can be updated and its content changed, either at the selection of the user or unilaterally. In point of fact, it is herewith possible to display advertisements which accord with the wishes of clients, just as with television commercials.

Other Modifications

It is also possible to provide the embodiment aspects described in the foregoing in variously modified forms. For example, in the embodiment aspects, advertising functions are built into application functions for exchanging labels as message information, but advertising functions may be added by other methods. More specifically, an icon for bringing up an ordinary application may be made capable of displaying advertisements, or advertising functions may be added to part of a character figure upbringing application, or advertising functions may be built into part of the task bar beforehand.

The embodiment aspects described in the foregoing are limited to advertising, but configurations may be implemented wherewith it is possible to display government notices or news as the notification information instead of advertising information.

In the embodiment aspects described in the foregoing, moreover, file groups are configured wherewith the advertising information and label information are divided. The file configuration is not limited thereby, however, and file design changes can be made as desired.

In the embodiment aspects described in the foregoing, furthermore, intercommunications between notification information display apparatuses is limited to the scope of an LAN, but the configuration may be made so that transmissions of message information and the like are possible between notification information display apparatuses in remote areas via a router and public communication lines. It is also possible to use the commonly known functions available in internet electronic mail.

The delivery system data base structure may also be made some other data base structure than one comprising an advertising information data base and label information data base.

The entire disclosure of Japanese Patent Application No. H10-184963 filed on Jun. 30, 1998, including specification, claims, drawings and summary, are incorporated herein by refer in its entirety.

Industrial Applicability

As based on the present invention, the configuration is made so that it is possible to display advertisements and other notification information in a label image, wherefore a highly effective advertising environment can be provided in a personal computer environment.

As based on the present invention, the configuration is made so that it is possible to control the display of advertisements and other notification information according to time, wherefore an advertising environment can be provided wherewith it is possible to conduct advertising which is coordinated with times of high advertising effectiveness.

As based on the present invention, URLs are set in the advertisements and other notification information, wherefore an advertising environment can be provided wherewith it is possible to present more specific advertising information when a user so desires.

As based on the present invention, the configuration is made so that it is possible to present images which simulate the image of an actual paper label, wherein are secured display spaces for advertisements and other notification information, wherefore an advertising environment can be provided wherewith it is possible to conduct effective advertising while stimulating user interest.

As based on the present invention, the configuration is made to that it is possible to alter the label images, wherefore an advertising environment can be provided wherewith it is possible to stimulate user interest.

As based on the present invention, the configuration is made so that it is possible to display attractive label images which speak dialogue lines, wherefore an advertising environment can be provided wherewith it is possible to present useful information while stimulating user interest.

As based on the present invention, whether or not labels can be displayed is determined by comparing identifiers assigned to the label information against identifiers assigned to the apparatus, wherefore it is possible, using these identifiers, to have only those labels displayed which one wishes displayed.

As based on the present invention, the configuration is made so that it is possible to sequentially add advertisements and other notification information from the delivery system, wherefore an advertising environment can be provided wherewith it is possible to conduct highly effective advertising wherein advertisements are changed according to time.

What is claimed is:

1. A notification information display apparatus comprising:
   a notification information memory area for storing notification information for displaying prescribed information, the notification information being changeable by at least one of a user and a network;
   a label information memory area for storing label information for providing an area for displaying said notification information, the label information being to display a label image directly on a desktop of a computer; and
   a controller configured so as to refer said label information memory area and said notification information memory area, and output image data for synthesizing at least one selected from the group consisting of notification images and notification character strings based on said notification information, and displaying these on the label image generated on basis of said label information,
   wherein said notification information includes advertising information and time-designating information, both of which are downloadable through the network, and the time-designating information specifying time that the advertising information is to be displayed, and
   wherein said controller compares the time-designating information with time information defining current time, and, when the current time corresponds with the display time specified by the time-designating information, enables the display of at least the advertising information.

2. The notification information display apparatus according to claim 1, wherein:

said notification information includes address information that indicates network addresses related to said notification, and said controller in configured so as, when said address information is contained in said notification information, to incorporate that address information in the notification character strings which are synthesized in said label image, and to establish link information for linking said network address to that address information.

3. The notification information display apparatus according to claim 1, wherein:

said label information contains label image data for front and back sides thereof, respectively, and said controller is configured so as to select either front or back side of said label image and to output image data for either front or back side.

4. The notification information display apparatus according to claim 1, wherein:

said label information comprises one or more replacement label image data for replacing and displaying said label image, either in part or in whole, and said controller is configured so as to select replacement label image data in response to operating signals, and to generate image data for displaying an image corresponding to said replacement label image data selected in part of whole of that label image.

5. The notification information display apparatus according to claim 1, wherein:

said label information includes dialogue line information for displaying dialogue lines corresponding to said label image, and said controller is configured so as to be able to detect position of a cursor, and so as to be able, after determining that said cursor position so detected is a position corresponding to said label image, to refer said dialogue line information and display said dialogue line in vicinity of that label image.

6. The notification information display apparatus according to claim 1, wherein:

said controller is configured so as to store message information representing messages entered by an operator, and so as to be able to generate image data for displaying messages based on such message information in a designated area of said label image.

7. The notification information display apparatus according to claim 6, wherein:

said label information includes minimized image data for displaying said label image in a minimized size, and said controller is configured so as to be able, when minimization is designated, to output said minimized image data in place of image data that display said label image, and, upon determining that cursor is positioned over that minimized image, so as to be able to refer message information associated with that label and display at least part of that message in vicinity of that minimized image.

8. The notification information display apparatus according to claim 1, wherein:

said label information includes a prescribed identifier, and said controller is configured so as to compare an identifier designated in that notification display apparatus against an identifier contained in said label information, and, when those two identifiers agree, to use that label information in generating a label image.

9. The notification information display apparatus according to claim 1, wherein:

said controller is configured so as to calculate total number of label images produced, and so as to be able, when that total number of label images has reached a predetermined standard number, to display a specific message.

10. The notification information display apparatus according to claim 6, wherein:

said notification information display apparatus is configured so as to communicate with other notification information display apparatuses; further provided with a destination information memory area for storing destination information that indicates destination information for said other notification information display apparatuses; and said controller is configured so as, when transmission of a message is designated, to refer that destination information and send said message information to designated destination.

11. The notification information display apparatus according to claim 10, wherein:

said notification information display apparatus is configured so that terminal specifying information for specifying said notification information display apparatus is sent to another notification information display apparatus with prescribed timing, and so that, based on said terminal specifying information received from other notification information display apparatuses, a list of other notification information display apparatuses to which that notification information display apparatus is capable of transmitting message information is displayed, inclusive of a transmit enablement display.

12. The notification information display apparatus according to claim 10, wherein:

said notification information display apparatus is configured so as, when characteristic information for said notification information display apparatus has been altered, to send terminal specifying information including that altered characteristic information to another notification information display apparatus, and so that, when terminal specifying information has been received from other notification information display apparatuses, based on that terminal specifying information so received, that notification information display apparatus updates list of notification information display apparatuses capable of transmitting message information.

13. The notification information display apparatus according to claim 6, wherein:

said notification information display apparatus is configured so as to communicate with other notification information display apparatuses, and said controller is configured so as, when message information is received from other notification information display apparatuses, to generate image data for displaying a message based on that message information in a prescribed area of said label image.

14. The notification information display apparatus according to claim 13, wherein:

said controller is configured so as to output image data for selectively displaying front and back sides of said label image in conjunction with operating signals, and so that, when said message information is received and said label image is displayed, back side of that label image wherein are synthesized a notification image and/or part of a notification character string based on said notification information is displayed first, and a message based on said message information is displayed on front side that is displayed on basis of operator input.

15. The notification information display apparatus according to claim 13, wherein:
said controller is configured so as, when setting information for said label image is contained in message information received from said other notification information display apparatuses, to generate image data for displaying that label image in a display mode corresponding to that setting information.

16. The notification information display apparatus according to claim 13, wherein:
said controller is configured so as, in cases where message information has been received from another notification information display apparatus and referred by an operator, to transmit have-opened information indicating that that message information has been referred to said other notification information display apparatus which communicated that message information.

17. A notification information display system configured so that communications are conducted via a network between a notification information display apparatus and a delivery system, said notification information display apparatus comprising:
a notification information memory area for storing notification information for displaying prescribed information, the notification information being changeable by at least one of a user and a network;
a label information memory area for storing label information for providing an area for displaying said notification information, the label information being to display a label image directly on a desktop of a computer; and
a controller configured so as to refer said label information memory area and said notification information memory area, and output image data for synthesizing at least one selected from the group consisting of notification images and notification character strings based on said notification information, and displaying these on the label image generated on basis of said label information,
wherein said notification information includes advertising information and time-designating information, both of which are downloadable through the network, and the time-designating information specifying time that the advertising information is to be displayed, and
wherein said controller compares the time-designating information with time information defining current time, and, when the current time corresponds with the display time specified by the time-designating information, enables the display of at least the advertising information,
and said delivery system comprising:
a notification information database for storing said notification information;
a label information database for storing said label information; and
a server for controlling communications between the notification information database and the label information database and said notification information display apparatus; wherein:
said server is configured so as to transmit at least one of said notification information stored in said notification information database and said label information stored in the said label information database, with specified timing, to said notification information display apparatus.

18. The notification information display system according to claim 17, wherein:
said controller in said notification information display apparatus monitors display time-designating information contained in said notification information memory area and, upon determining that predetermined conditions for end time for that display time period have been reached, connects to said delivery system via said network; and said server of that delivery system is configured so as, after being connected to that notification information display apparatus, to transmit new notification information and/or label information for that notification information display apparatus.

19. A machine-readable recording medium whereon is recorded a program for causing a computer to execute the steps of:
referring notification information for displaying prescribed notification and label information for providing space for displaying said notification, the label information being to display a label image directly on a desktop of a computer; and
generating image data for synthesizing at least one of notification images and notification character strings based on said notification information and displaying same in label image generated on basis of said label information,
wherein said notification information includes advertising information and time-designating information, both of which are downloadable through a network, and the time-designating information specifying time that the advertising information is to be displayed, and
wherein said controller compares the time-designating information with time information defining current time, and, when the current time corresponds with the display time specified by the time-designating information, enables the display of at least the advertising information.

20. The recording medium according to claim 19, whereon is recorded a program or programs for also causing a computer to execute the steps of:
including address information indicating a network address related to a notification in a notification character string synthesized in said label image; and
setting link information for linking said network address to that address information.

21. The recording medium according to claim 19, whereon is recorded a program or programs for also causing a computer to execute the steps of:
detecting cursor position;
referring dialogue line information displaying a dialogue line associated with said label image upon determining that said cursor position detected coincides with a position corresponding to said label image; and
generating image data for displaying said dialogue line in vicinity of said label image.

22. The recording medium according to claim 19, whereon is recorded a program or programs for also causing a computer to execute the steps of:

storing message information indicating messages input by an operator; and generating image data for displaying messages based on that message information in a prescribed area in said label image.

23. The recording medium according to claim 19, whereon is recorded a program or programs for also causing a computer to execute the steps of:

comparing an identifier designated in that notification information display apparatus and a specified identifier included in said label information; and generating a label image using that label information when both identifiers agree.

24. The recording medium according to claim 19, whereon is recorded a program or programs for also causing a computer to execute the steps of:

calculating total number of label images produced;

determining whether that label image total number so calculated has reached a standard number or not; and displaying a specific message when said total number has reached said standard number.

* * * * *